United States Patent
Shimezawa et al.

(10) Patent No.: US 9,350,478 B2
(45) Date of Patent: May 24, 2016

(54) WIRELESS COMMUNICATION SYSTEM, WIRELESS COMMUNICATION DEVICE, AND WIRELESS COMMUNICATION METHOD

(75) Inventors: Kazuyuki Shimezawa, Osaka (JP); Toshizo Nogami, Osaka (JP); Shohei Yamada, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 92 days.

(21) Appl. No.: 13/265,269

(22) PCT Filed: Apr. 26, 2010

(86) PCT No.: PCT/JP2010/002978
§ 371 (c)(1),
(2), (4) Date: Oct. 19, 2011

(87) PCT Pub. No.: WO2010/122818
PCT Pub. Date: Oct. 28, 2010

(65) Prior Publication Data
US 2012/0033571 A1 Feb. 9, 2012

(30) Foreign Application Priority Data
Apr. 24, 2009 (JP) .................................. 2009-106251

(51) Int. Cl.
*H04W 4/00* (2009.01)
*H04W 36/00* (2009.01)
(Continued)

(52) U.S. Cl.
CPC ............ *H04J 11/0053* (2013.01); *H04B 7/026* (2013.01); *H04B 7/0689* (2013.01);
(Continued)

(58) Field of Classification Search
CPC H04B 17/0042; H04L 1/0026; H04L 1/0021; H04W 76/02; H04W 88/04; H04W 84/18; H04W 36/30; H04W 7/2628
See application file for complete search history.

(56) References Cited

U.S. PATENT DOCUMENTS 6,278,877 B1 * 8/2001 Brederveld et al. ........... 455/434
7,715,354 B2 * 5/2010 Arunan et al. ................ 370/338
(Continued)

FOREIGN PATENT DOCUMENTS

WO    WO 2008/114724 A1    9/2008

OTHER PUBLICATIONS

3GPP, "Technical Specification Group Radio Access Network; Evolved Universal Terrestrial Radio Access (E-UTRA); Physical layer procedures (Release 8)", 3GPP TS 36.213 V8.5.0 (Dec. 2008), pp. 1-23.
(Continued)

*Primary Examiner* — Melanie Jagannathan
(74) *Attorney, Agent, or Firm* — Birch, Stewart, Kolasch & Birch, LLP

(57) ABSTRACT

A wireless communication system includes a first channel state measurer and a second channel state measurer. When a second communication device measures a state of a channel between the second communication device and a first communication device using reference signals transmitted from the first communication device, the first channel measurer is configured to measure a state of the channel including an interference due to a signal transmitted from another first communication device. When measuring the state of the channel between the second communication device and the first communication device using the reference signals transmitted from the first communication device, the second channel state measurer measures the state of the channel while suppressing the interference due to the signal transmitted from the another first communication device. Accordingly, the wireless communication system can generate adequate feedback information both when cooperative communication is performed and when cooperative communication is not performed.

19 Claims, 24 Drawing Sheets

(51) Int. Cl.
  *H04J 11/00* (2006.01)
  *H04B 7/02* (2006.01)
  *H04B 7/08* (2006.01)
  *H04W 72/08* (2009.01)
  *H04B 17/345* (2015.01)
  *H04B 7/06* (2006.01)
  *H04L 1/00* (2006.01)
  *H04L 5/00* (2006.01)
  *H04L 25/02* (2006.01)
  *H04L 25/03* (2006.01)

(52) U.S. Cl.
  CPC ............ *H04B 7/0854* (2013.01); *H04B 17/345* (2015.01); *H04L 5/0035* (2013.01); *H04L 5/0048* (2013.01); *H04L 5/0073* (2013.01); *H04W 72/082* (2013.01); *H04B 7/068* (2013.01); *H04B 7/0671* (2013.01); *H04B 7/0678* (2013.01); *H04L 1/0026* (2013.01); *H04L 5/0016* (2013.01); *H04L 5/0023* (2013.01); *H04L 5/0053* (2013.01); *H04L 25/0234* (2013.01); *H04L 25/03343* (2013.01); *H04L 2001/0092* (2013.01); *H04L 2025/03426* (2013.01); *H04L 2025/03808* (2013.01)

(56) References Cited

U.S. PATENT DOCUMENTS

| | | | |
|---|---|---|---|
| 8,379,600 B2* | 2/2013 | Kim et al. | 370/332 |
| 2003/0214926 A1* | 11/2003 | Choi et al. | 370/335 |
| 2006/0030362 A1* | 2/2006 | Fukuda | 455/561 |
| 2006/0148411 A1* | 7/2006 | Cho | H04L 1/0026 455/67.13 |
| 2006/0218298 A1* | 9/2006 | Knapp et al. | 709/238 |
| 2007/0224989 A1* | 9/2007 | Soong et al. | 455/436 |
| 2008/0014991 A1* | 1/2008 | Laroia et al. | 455/561 |
| 2008/0026783 A1* | 1/2008 | Lee | 455/522 |
| 2008/0205345 A1* | 8/2008 | Sachs et al. | 370/332 |
| 2010/0067464 A1 | 3/2010 | Higuchi | |

OTHER PUBLICATIONS

3GPP, "Technical Specification Group Radio Access Network; Further Advancements for E-UTRA; Physical Layer Aspects (Release X)", 3GPP TR 36.814 V0.3.2 (Jan. 2009), pp. 1-30.

CATT, "Further Investigations on the Configurations of CSI-RS for LTE-A", 3GPP TSG RAN WG1 meeting #58, R1-093520, Aug. 24-28, 2009, Shenzhen, China, pp. 1-5.

International Search Report, dated Aug. 3, 2010 in PCT/JP2010/002978.

Nokia, Nokia Siemens Networks, "CSI-RS Design for LTE-Advanced Downlink", 3GPP TSG RAN WG1 Meeting #56-bis, R1-091351, Mar. 23-27, 2009, Seoul, Korea, pp. 1-7.

Panasonic, "Downlink CSI-RS Design for Inter-Cell Scenarios", 3GPP TSG RAN WG1 Meeting #58, R1-093457, Aug. 24-28, 2009, Shenzhen, China, pp. 1-2.

LG Electronics, "UE Measurement and Feedback for DL CoMP", 3GPP TSG RAN WG1 Meeting #56bis, R1-091193, Seoul, Korea, Mar. 16-20, 2009.

CATT: "Analysis of Feedback Signalling for Downlink CoMP", 3GPP TSG RAN WG1, meeting #56bis; R1-091520; retrieved Mar. 18, 2009, Seoul Korea, 3 pages provided.

European Search Report dated Jun. 28, 2012 for European Applicatoin No. 10766878.2.

Interdigital: "Analysis of Feedback Mechanisms for CoMP", 3GPP TSG RAN WG1 Meeting #57bis; R1-092585, retrieved Jun. 24, 2009, Los Angeles, USA, 10 pages provided.

International Search Report, completed Jun. 1, 2012 by the Eurasion Patent Office, and forwarded Jul. 19, 2012 for Eurasian Application 201101552.

CATT, "Analysis of Feedback Signalling for Downlink CoMP", 3GPP TSG RAN WG1 Meeting #57, US, San Francisco, May 4-8, 2009, R1-091986, pp. 1-4.

* cited by examiner

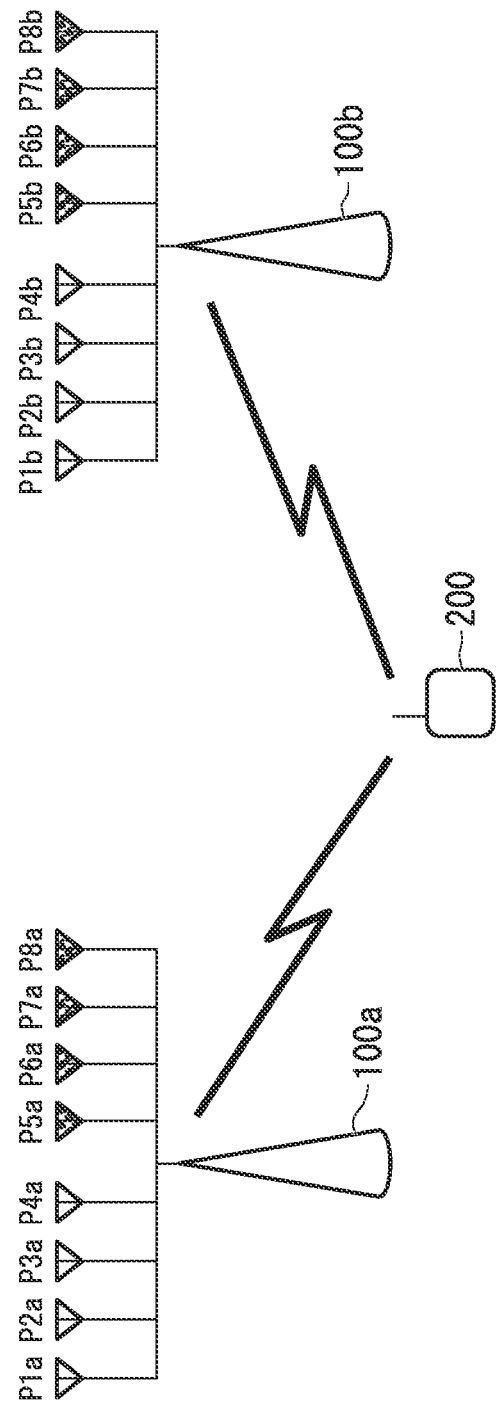

WIRELESS COMMUNICATION SYSTEM, WIRELESS COMMUNICATION DEVICE, AND WIRELESS COMMUNICATION METHOD

TECHNICAL FIELD

The present invention relates to a wireless communication system, a wireless communication device, and a wireless communication method.

Priority is claimed on Japanese Patent Application No. 2009-106251, filed Apr. 24, 2009, the content of which is incorporated herein by reference.

BACKGROUND ART

A wireless communication system, such as LTE ((third generation) Long Term Evolution), LTE-Advanced (Advanced LTE), and WiMAX (Worldwide Interoperability for Microwave Access), employs a cellular configuration in which multiple areas covered by a base station (a transmission station, a transmission device, or eNodeB) are arranged in a cellular manner, thereby enabling an increase in wider communication areas. Additionally, different frequencies are used between neighboring cells (sectors) so that a mobile terminal (a reception station, a mobile station, a mobile terminal device 200, or UE (User Equipment)) can perform communication without being subjected to interferences. However, there has been a problem regarding the frequency use efficiency. For this reason, the same frequency is repeatedly used for each cell (sector) to greatly enhance the frequency use efficiency, necessitating countermeasures against interferences with respect to a mobile terminal present in a cell edge region.

In view of the above situations, a method of reducing or suppressing interferences with respect to a mobile terminal in a cell edge region by performing inter-cell cooperative communication, in which neighboring cells cooperate with each other, has been considered. As such a method, for example, a CoMP (Cooperative Multipoint) transmission method is considered in, for example, Non-Patent Document 1. Additionally, as the CoMP transmission method, joint processing or joint transmission in which the same or different data are cooperatively transmitted between cells, or coordinated scheduling/beamforming in which scheduling or control is cooperatively performed between cells, are considered.

FIGS. 21 and 22 illustrate an example of a mobile terminal moving from a cell central region to a cell edge region. In the case of FIG. 21, a mobile terminal M1 is present in a cell central region served by a base station B1, communicates with the base station B1, and is moving toward a cell edge region between the base station B1 and a base station B2. In the case of FIG. 22, the mobile terminal M1 is present in the cell edge region between the base stations B1 and B2, and is performing cooperative communication with the base stations B1 and B2. It is understood from FIGS. 21 and 22 that the mobile terminal performs communication with a single base station or cooperative communication with multiple base stations depending on the position of the mobile station with respect to the base stations.

On the other hand, more efficient data transmission can be achieved by adaptively controlling, according to a channel state between the base station and the mobile terminal, a modulation scheme, MCS (Modulation and Coding Scheme), the number of spatial multiplexing (layer, rank), precoding weight (precoding matrix), and the like. For example, a method disclosed in Non-Patent Document 2 can be used.

For example, in view of a downlink for data transmission from a base station to a mobile station, to perform such an adaptive control, as shown in FIG. 23, it is necessary for a mobile terminal M to estimate a downlink channel state based on a reference signal RS (a pilot signal or a known signal) which is transmitted from and unique to a base station B and to feed back feedback information FI, such as CSI, to the base station through an uplink for data transmission from the mobile station to the base station.

If a multi-carrier transmission scheme, such as OFDM (Orthogonal Frequency Division Multiplexing) or OFDMA (Orthogonal Frequency Division Multiple Access), is used as a transmission scheme, reference signals scattered over resource elements in frequency and time domains may be used as reference signals unique to a base station, as shown in FIG. 24. As feedback information based on a channel state estimated using such reference signals, a frequency response, CSI (Channel State Information) indicating a channel state, such as SINR (Signal to Interference plus Noise power Ratio), recommended transmission format information with respect to the base station which are CQI (Channel Quality Indicator), RI (Rank Indicator) and/or PMI (Precoding Matrix Index), and the like may be used.

CITATION LIST

Non-Patent Document

[Non-Patent Document 1] 3rd Generation Partnership Project; Technical Specification Group Radio Access Network; Further Advancements for E-UTRA Physical Layer Aspects (Release X), 3GPP TR 36.814 V0.3.2 (2009-01), January, 2009.

[Non-Patent Document 2] 3rd Generation Partnership Project; Technical Specification Group Radio Access Network; Evolved Universal Terrestrial Radio Access (E-UTRA); Physical layer procedures (Release 8), 3GPP TS 36.213 V8.5.0 (2008-12), December, 2008

DISCLOSURE OF THE INVENTION

Problems to be Solved by the Invention

As explained above, in the conventional radio communication system, a channel state is calculated based on reference signals transmitted from each base station device, and, for example, a modulation scheme and an encoding rate according to the channel state are specified by feedback information, thereby performing adaptive modulation. When cooperative communication is being performed, however, multiple base stations cooperatively transmit signals, and channel states regarding the signals transmitted cooperatively differ from those calculated based on the reference signals transmitted independently from each of the base stations. For this reason, there is a problem in that the conventional feedback information is not adequate when cooperative communication is being performed.

The present invention has been made in view of the above problem. An object of the present invention is to provide a wireless communication system, a wireless communication device, and a wireless communication method for generating adequate feedback information for cooperative communication and/or non-cooperative communication.

Means for Solving the Problems (1) A wireless communication system of the present invention includes: at least two first communication devices; and at least one second communication device configured to communicate with the first communication devices. The first communication device includes: a reference signal generator configured to generate reference signals; and a radio transmitter configured to transmit the reference signals and transmit transmission data to the second communication device. The second communication device includes: a first channel state measurer configured to measure, when measuring a state of a channel between the second communication device and one of the first communication devices using the reference signals transmitted from the at least one of the first communication devices, a state of the channel including an interference due to a signal transmitted from the other one of the first communication devices; and a second channel state measurer configured to measure, when measuring the state of the channel between the second communication device and the one of the first communication devices using the reference signals transmitted from the at least one of the first communication devices, the state of the channel while suppressing the interference due to the signal transmitted from the other one of the first communication devices.

(2) According to the aforementioned wireless communication system of the present invention, one of the first communication device and the second communication device includes: a communication parameter determining unit configured to determine a communication parameter to be used when transmission from the first communication device to the second communication device is performed. The communication parameter determining unit is configured to determine the communication parameter using a result of measurement performed by one of the first channel state measurer and the second channel state measurer.

(3) According to the aforementioned wireless communication device of the present invention, the reference signal generator generates the reference signal based on a sequence that is predetermined and differs between the first communication devices. The second channel state measurer is configured to perform a despreading process using the sequence on the reference signals transmitted from the first communication device, in order to suppress the interference due to the signal transmitted from the other one of the first communication devices.

(4) The aforementioned wireless communication system of the preset invention has a first communication scheme in which a first communication device and at least one second communication device communicate with each other, and a second communication scheme in which a plurality of the first communication devices cooperatively communicate with the at least one second communication device. The first communication device further includes a communication scheme selector configured to select one of the first and second communication schemes. The second communication device further includes a communication scheme switcher configured to switch between the first and second state measurers based on the one of the first and second communication schemes which is selected by the communication scheme selector.

(5) According to the aforementioned wireless communication system of the present invention, if the first communication scheme is selected, the communication scheme switcher is configured to switch to the first channel state measurer. If the second communication scheme is selected, the communication scheme switcher is configured to switch to the second channel state measurer.

(6) According to the aforementioned wireless communication system of the present invention, the second channel state measurer is configured to perform the despreading process based on a length of the sequence.

(7) According to the aforementioned wireless communication system of the present invention, the reference signal generator is configured to generate the reference signals based on a pseudo noise sequence.

(8) According to the aforementioned wireless communication system of the present invention, the second communication device further includes a channel estimator configured to estimate a channel variation value based on the reference signals. The second channel state measurer is configured to determine, based on the channel variation value, a combination of the reference signals to be subjected to the despreading process.

(9) According to the aforementioned wireless communication system of the present invention, the second channel state measure is configured to determine a combination of the reference signals to be subjected to the despreading process, based on an interference power from the first communication device present in a peripheral region.

(10) According to the aforementioned wireless communication system of the present invention, the second channel state measurer is configured to combine the reference signals spread in a frequency domain, in order to perform the despreading process.

(11) According to the aforementioned wireless communication system of the present invention, the second channel state measurer is configured to combine the reference signals spread in a time domain, in order to perform the despreading process.

(12) A wireless communication device of the present invention in a wireless communication system includes: at least two other wireless communication devices; and at least one wireless communication device configured to communicate with the other wireless communication devices. The wireless communication device includes: a first channel state measurer configured to measure, when measuring a state of a channel between the wireless communication device and one of the other wireless communication devices using reference signals transmitted from the at least one of the other wireless communication devices, a state of the channel including an interference due to a signal transmitted from the other one of the other communication devices; and a second channel state measurer configured to measure, when measuring the state of the channel between the wireless communication device and the one of the other wireless communication devices using the reference signals transmitted from the at least one of the other wireless communication devices, the state of the channel while suppressing the interference due to the signal transmitted from the other one of the other communication devices.

(13) A wireless communication method of the present invention is a wireless communication method for a wireless communication system including: at least two first communication devices; and at least one second communication device configured to communicate with the first communication devices. The wireless communication method includes: a first step of the first communication device generating reference signals; a second step of the first communication device transmitting transmission data and the reference signals to the second communication device; a third step of the second communication device, when measuring a state of a channel between the second communication device and one of the first communication devices using the reference signals transmitted from the at least one of the first communication devices, measuring a state of the channel including an interference due to a signal transmitted from the other one of the first communication device; and a fourth step of the second communication device, when measuring the state of the channel between the second wireless communication device and the one of the first wireless communication devices using the reference signals transmitted from the at least one of the first wireless communication devices, the state of the channel while suppressing the interference due to the signal transmitted from the other one of the first communication devices.

Effects of the Invention

According to the present invention, in the wireless communication system that can perform cooperative communication, adequate feedback information can be generated for cooperative communication and/or non-cooperative communication.

BRIEF DESCRIPTION OF THE DRAWINGS

FIG. 9 is a diagram illustrating an outline of allocation of antenna ports performed by a base station device according to a second embodiment of the present invention.

BEST MODE FOR CARRYING OUT THE INVENTION

First Embodiment

Figure 1:
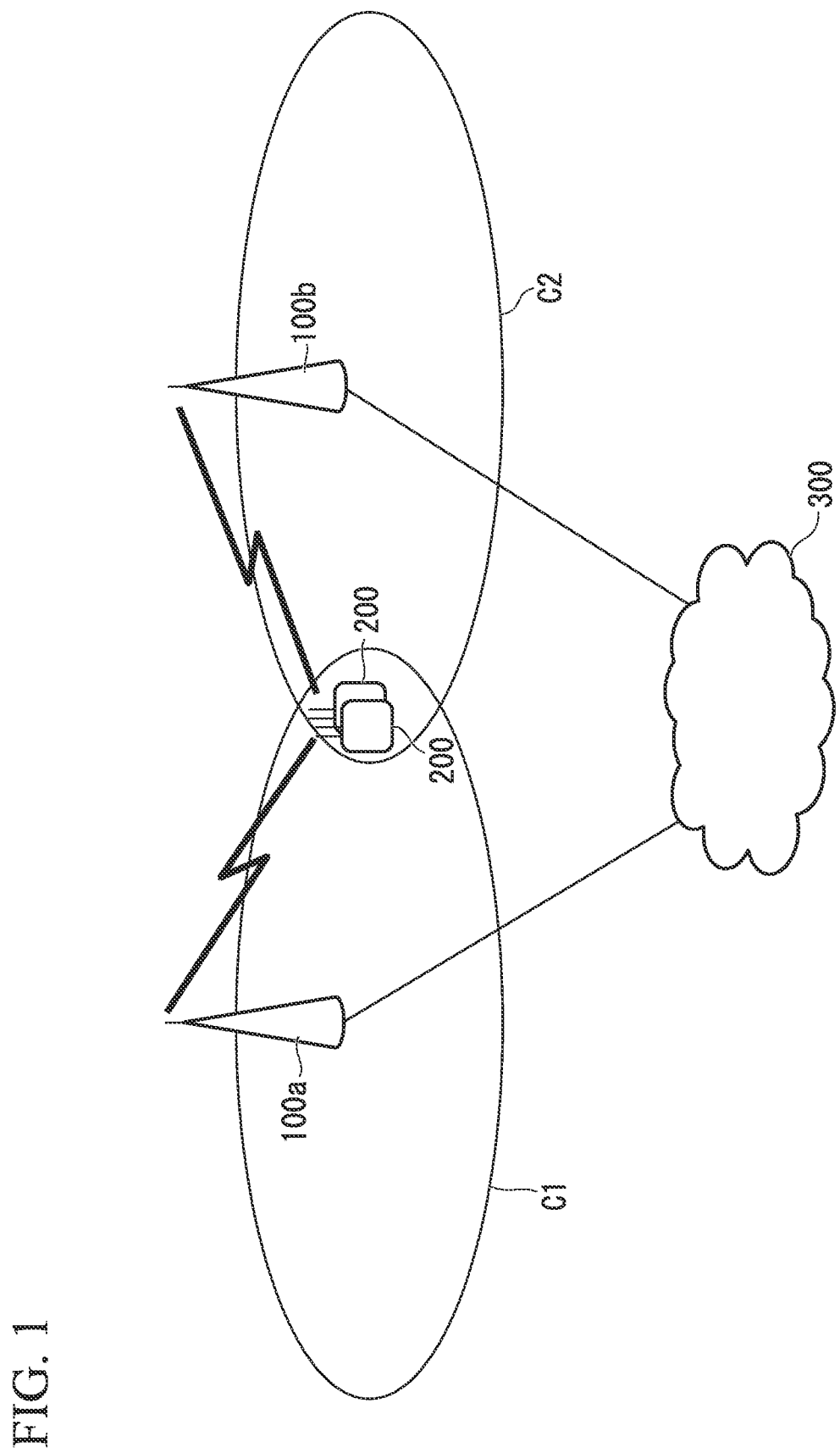
FIG. 1 is a schematic diagram illustrating a configuration of a wireless communication system according to a first embodiment of the present invention.

Hereinafter, a first embodiment of the present invention is explained with reference to the drawings. FIG. 1 is a schematic diagram illustrating a configuration of a wireless communication system according to the first embodiment. A mobile communication system, which is the wireless communication system of the first embodiment, includes: base station devices 100a and 100b (also referred to as first communication devices, cells, transmission points, or transmission antenna groups); multiple mobile terminal devices 200 (also referred to as second communication devices or reception terminals) each of which communicates with the base station devices 100a and 100b; a network 300 connecting the base station devices 100a and 100b. In the case of FIG. 1, the mobile terminal device 200 is present in a region where a cell C1 that is a communication area served by the base station device 100a overlaps a cell C2 that is a communication area served by the base station device 100b. The base station devices 100a and 100b have the same configuration. For this reason, the configuration of the base station device 100a is explained, and explanations of the configuration of the base station device 100b are omitted hereinafter. Although it is explained in the first embodiment that the mobile communication system includes multiple mobile terminal devices 200, the mobile communication system may include one mobile terminal device 200.

Figure 2:
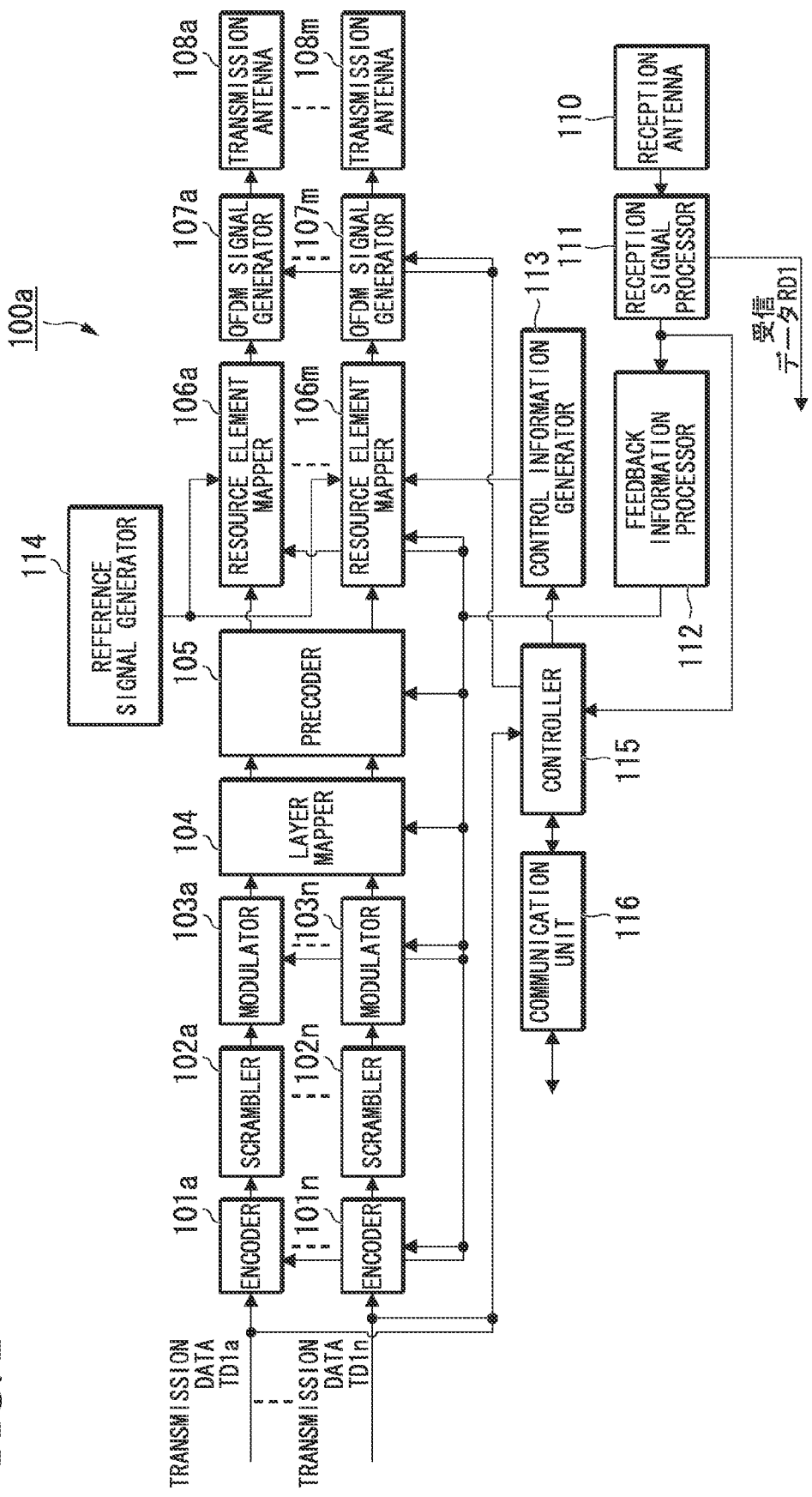
FIG. 2 is a schematic block diagram illustrating a configuration of a base station device 100a according to the first embodiment.

FIG. 2 is a schematic block diagram illustrating a configuration of the base station device 100a according to the first embodiment. As shown in FIG. 1, the base station device 100a includes: encoders 101a to 101n; scramblers 102a to 102n; modulators 103a to 103n; a layer mapper 104; a precoder 105; resource element mappers 106a to 106m; OFDM signal generators 107a to 107m; transmission antennas 108a to 108m; a reference signal generator 114; a reception antenna 110; a reception signal processor 111; a feedback information processor 112; a control information generator 113; a controller 115; and a communication unit 116. The number of the encoders 101a to 101n, the number of the scramblers 102a to 102n, and the number of the modulators 103a to 103n are identical to the maximum number of codewords to be transmitted in parallel. The number of the resource element mappers 106a to 106m, the number of OFDM signal generators 107a to 107m, and the number of the transmission antennas 108a to 108m are identical to the number of transmission antennas.

A reception antenna 110 receives, through uplink, a data signal including feedback information transmitted from the mobile terminal device 200. The reception signal processor 111 performs, on the data signal received by the reception antenna 110, a reception process, such as an OFDM demodulation process, a demodulation process, and a decoding process, which are reception processes with respect to transmission processes performed by the mobile terminal device 100 for transmission. Thus, the reception signal processor 111 obtains reception data RD1 and control data. The reception signal processor 111 outputs the control data to the feedback information processor 112 and the controller 115. The reception data RD1 is data obtaining by performing a demodulation process, a decoding process, and the like on a transmission data signal transmitted by the mobile terminal device 200. The control data is data for controlling communication between the base stations 100a and 100b and the mobile terminal device 200.

If there are multiple mobile terminal devices 200 each of which communicates with the base station device 100a, any multiple access scheme, such as SC-FDMA (Single Carrier-Frequency Division Multiple Access), OFDMA, time division multiple access, and code division multiple access, may be used for performing user multiplexing in uplink (i.e., signal transmission from the mobile terminals to the base station). The base station device 100a may use various methods of identifying the mobile terminal device 200 that is a transmission source of control data, such as feedback information.

For example, the base station device 100a specifies to each of the mobile terminal devices 200, resources (elements used for transmission of signals and divided by time, frequency, code, a spatial domain, and the like) to be used for transmission of feedback information. Then, the mobile terminal device 200 transmits feedback information using the specified resources. When receiving the feedback information, the base station device 100a can identify, based on the resources allocated with the feedback information, the mobile terminal device 100a that has transmitted the feedback information. Alternatively, the unique identification information is added to each feedback information, so that the base station device 100a can identify, based on the identification information, the mobile terminal device 100a that has transmitted the feedback information.

The feedback information processor 112 extracts, from the control data input, feedback information, such as CSI, CQI, PMI, and RI. Based on the feedback information, the feedback information processor 112 outputs, to the encoders 101a to 101n, the modulators 103a to 103n, the layer mapper 104, the precoder 105, and the resource element mappers 106a to 106m, control signals for performing various adaptive controls on data signals to be transmitted to the mobile terminal device 200.

Here, an adaptive control method based on the feedback information is explained. A case, in which information specifying a transmission format (communication parameters CQI, PMI, and RI) recommended for the base station device 100a is used as the feedback information, is explained first. Since the base station device 100a and the mobile terminal device 200 store indexed transmission formats known to both devices, the base station device 100a performs adaptive control based on the transmission format. Specifically, CQI is information indicating an encoding rate and a modulation scheme, the feedback information processor 112 controls the encoders 101a to 101n (an encoding rate) and the modulators 103a to 103n (a modulation scheme) based on the CQI.

PMI is information indicating a precoding matrix by which modulation symbol sequences are multiplied, the feedback information processor 112 controls the precoder 104 according to the PMI. RI is information indicating the number of layer (rank), the feedback information processor 112 controls, according to the RI, the layer mapper 104 and an upper layer processor (not shown) that generates codewords. If feedback information related to mapping to resources is also included, the feedback processor 112 may control the resource element mappers 106a to 106m.

Next, a case, in which information indicating a channel state is used as the feedback information, is explained. In this case, the feedback information processor (communication parameter determining unit) 112 determines a transmission format (communication parameter) based on the information indicating a channel state, and thus can perform optimal control. For example, the mobile terminal device 200 determines, based on the fed back information indicating a channel state, a precoding matrix (communication parameter) so as to maximize the power when receiving signals transmitted from the base station device 100a or when receiving signals transmitted from the base station devices 100a and 100b. Then, the mobile terminal device 200 can determine an encoding rate, a modulation scheme, and the number of layer at that time, using various methods. As the information indicating a channel state, a frequency response indicating an amplitude and a phase of the channel state for each subcarrier, a time response indicating the complex amplitude for each delay time with respect to a preceding wave, SINR (Signal to Interference plus Noise Ratio), and the like may be used.

The controller (communication scheme selector) 115 determines, based on the input control data, whether or not to generate feedback information for the mobile terminal device 200 to perform cooperative communication with a neighboring cell (or simply whether or not to perform cooperative communication). Cooperative communication is also referred to as a first communication scheme. Communication without using cooperative communication is also referred to as a second communication scheme. The control information generator 113 generates a communication scheme control signal for reporting the content determined by the controller 115. Then, the control information generator 113 multiplexes the generated communication scheme control signal as a control data signal with a transmission data signal that will be explained later. Then, the control information generator 113 outputs, to the resource element mappers 106a to 106m, the multiplexed signal to be transmitted to the mobile terminal device 200.

Here, the controller 115 can determine whether or not to generate feedback information for the mobile terminal device 200 to perform cooperative communication with a neighboring cell based on various methods. For example, their methods are a method of performing handover control, or a determination method in which it is determined to generate the feedback information when the inter-cell reception power ratio or the inter-cell difference in path loss, which the mobile terminal device 200 includes in control data and feeds back, is compared to a predetermined threshold, and when the inter-cell reception power ratio or the inter-cell difference in path loss is smaller than threshold as a result of the comparison. Regarding contents to be determined, not only whether or not to perform cooperative communication, but also which communication scheme is to be used for cooperative communication (such as joint processing or joint transmission) are determined. Then, a signal indicating the determined communication scheme may be included in the communication scheme control signal. Alternatively, a signal indicating feedback information regarding the item corresponding to the determined communication scheme may be included in the communication scheme control signal.

The communication scheme control signal is multiplexed with another control data signal, and then the multiplexed signal is transmitted. Additionally, similar to the transmission data signal as will be explained later, the communication scheme control signal may be transmitted after being subjected to an encoding process, a scrambling process, a modulation process, a precoding process, and the like. Further, the communication scheme control signal may be transmitted by any one of transmission with one transmission antenna, transmission diversity scheme with multiple transmission antennas, spatial multiplexing transmission with multiple transmission antennas, and the like.

The controller 115 can be connected to the network 300 through the communication unit 116, and communicate with another base station (for example, a base station device 100b) through the network 300. The controller 115 of the base station device 100a communicates with the base station device 100b, performs frame synchronization and symbol synchronization between the base station devices, and thus controls the timing for the OFDM signal generator 107 to output a signal. When joint processing or joint transmission is performed, the controller 115 of the base station device 100a communicates with the base station device 100b, transmits to the base station device 100b, transmission data to be transmitted from the base station device 100a, so that the transmission data is also transmitted from the base station device 100b. Alternatively, the base station device 100a receives from the base station device 100b, transmission data to be transmitted from the base station device 100b, and inputs the received transmission data to the encoders 101a to 101n to perform transmission. Thus, the transmission data to be transmitted from the base station device 100a and the transmission data to be transmitted from the base station device 100b are made identical.

Codewords (transmission data TD1a to TD1n or information data signals), which are received from an upper layer processors (not shown) of the base station device 100a, are input word by word to the respective encoders 101a to 101n. Among the encoders 101a to 101n, codewords are input to respective encoders identical in number to the codewords to be transmitted in parallel, and nothing is input to the remaining ones of the encoders. The respective encoders 101a to 101n encode the input codewords by an error correction code, such as a turbo code, a convolutional code, and LDPC (Low Density Parity Check). Then, the encoders 101a to 101n output the encoded codewords to the associated ones of the scramblers 102a to 102n. The encoding rate for this encoding process is in accordance with an instruction from the feedback information processor 112. The codeword is a bundle of transmission data pieces, and may be a unit for performing a retransmission control process, such as HARQ (Hybrid Automatic Repeat reQuest), a unit for performing an error correction coding process, or a unit for performing an error detection coding process.

Each of the scramblers 102a to 102n generates, based on a cell ID or the like, a scramble code different for each base station device, and performs a scrambling process using the generated scramble code on the signal encoded by the associated one of the encoders 101a to 101n. When cooperative communication is performed between base stations, the same scramble code is generated between the base stations, and a scrambling process is performed.

Each of the modulators 103a to 103n performs, on the signal having been subjected to the scrambling process by the associated one of the scramblers 102a to 102n, a modulation process using a modulation scheme, such as BPSK (Binary Phase Shift Keying), QPSK (Quadrature Phase Shift Keying), and QAM (Quadrature Amplitude Modulation). The modulation scheme used for this modulation process is in accordance with an instruction from the feedback information processor 112.

The layer mapper 104 maps the signals output from the respective modulators 103a to 103n to layers (ranks) for performing spatial multiplexing, such as MIMO (Multi-Input Multi-Output). For example, when the number of codewords is 2, and the number of layers is 4, it can be considered that each of the two codewords is converted into two parallel signals to make the number of layers 4. However, the configuration is not limited thereto. The number of layers is in accordance with an instruction from the feedback information processor 112.

The precoder 105 performs a precoding process on the signals output from the layer mapper 104. Then, the precoder 105 converts the precoded signals into parallel signals identical in number to the antenna ports (transmission antennas). As the precoding process, a process of multiplying a precoding matrix specified by the feedback information processor 112 by a signal sequence, a process using a predetermined precoding matrix, CDD (Cyclic Delay Diversity), SFBC (Spatial Frequency Block Coding), STBC (Spatial Time Block Coding), TSTD (Time Switched Transmission Diversity), FSTD (Frequency Switched Transmission Diversity), and the like may be used. However, the precoding process is not limited thereto.

The reference signal generator 114 generates reference signals known to both the base station device 100a and the mobile terminal device 200, and outputs the generated reference signals to the resource element mappers 106a to 106m. At this time, arbitrary signals (sequences) may be used as long as the signals are known to both the base station device 100a and the mobile terminal device 200. As examples, a method of generating reference signals from a random number based on a cell ID or the like, and a method of generating signals based on a pseudo noise sequence (a pseudo random sequence, a spreading code, or a PN (Pseudo Noise) sequence) are explained in the first embodiment. The details thereof are explained later.

As the pseudo noise sequence, an M (Maximum-length) sequence, a Gold code, an orthogonal Gold code, a Barker code, an orthogonal code sequence (such as a Walsh Code, an OVSF (Orthogonal Variable Spreading Factor) code, and a Hadamard code), and the like may be used. Additionally, a sequence obtained by cyclically shifting those sequences or cyclically expanding those sequences may be used. Further, a sequence with excellent autocorrelation characteristics or cross-correlation characteristics may be searched using a calculator or the like and be used. However, the pseudo noise sequence is not limited thereto.

The resource element mappers 106a to 106m map the transmission data signals output from the precoder 105, the reference signals output from the reference signal generator 114, and the control data signal output from the control information generator 113 to resource elements associated with respective antenna ports. As an example, mapping of reference signals when the number of antenna ports is 4 is shown in FIG. 3.

Figure 3:
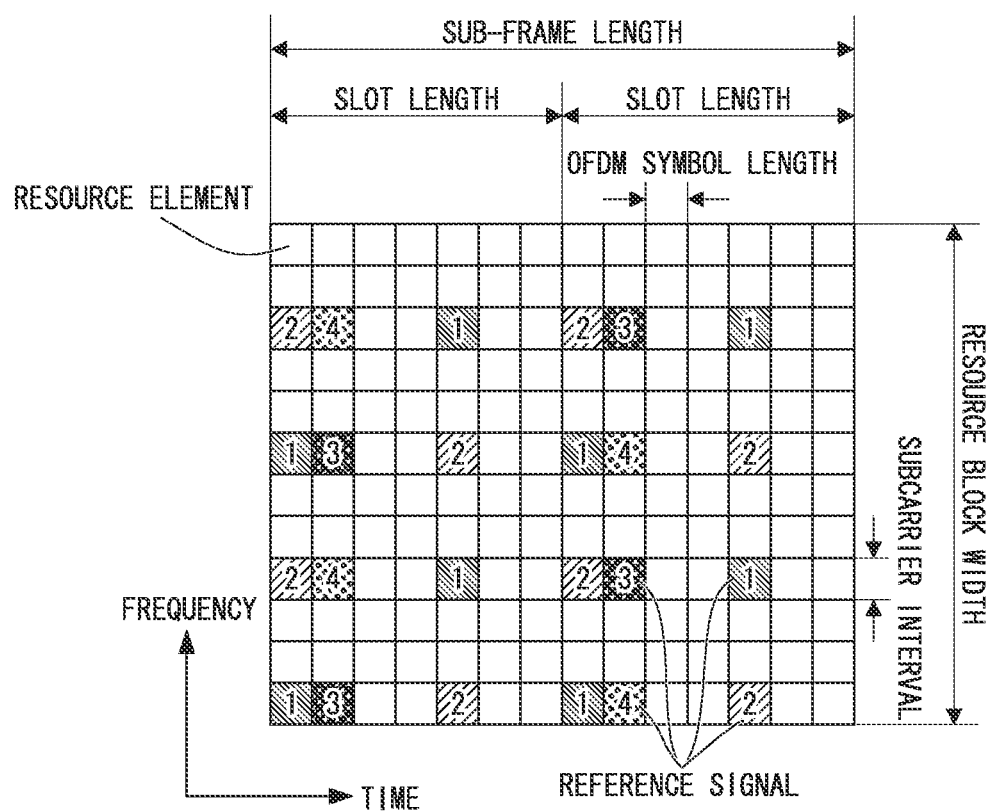
FIG. 3 is a diagram illustrating mapping of reference signals when the number of antenna ports is 4 according to the first embodiment.

FIG. 3 is a diagram illustrating arrangement of reference signals to resource blocks. FIG. 3 shows a case where two resource blocks, each of which includes 12 subcarriers in the frequency domain and 7 OFDM symbols in the time domain, are arranged in the time domain. Each subcarrier associated with one OFDM symbol is also referred to as a resource element. The length of the resource block in the time domain is referred to as a slot length. The length of two sequential resource blocks in the time domain is referred to as a subframe length.

The numbers allocated to respective hatched resource elements shown in FIG. 3 indicate that resource signals associated with the antenna ports 1 to 4 are allocated to the respective hatched resource elements. In the case of FIG. 3, regarding the first OFDM symbol in the time domain, a reference signal assigned with the antenna port 1 is allocated to the resource element associated with the first subcarrier counted from the smallest frequency. A reference signal assigned with the antenna port 2 is allocated to the resource element associated with the fourth subcarrier. A reference signal assigned to the antenna port 1 is allocated with the resource element associated with the seventh subcarrier. A reference signal assigned with the antenna port 2 is allocated to the resource element associated with the tenth subcarrier. Regarding the second OFDM symbol, a reference signal assigned with the antenna port 3 is allocated to the resource element associated with the first subcarrier counted from the smallest frequency. A reference signal assigned with the antenna port 4 is allocated to the resource element associated with the fourth subcarrier. A reference signal assigned with the antenna port 3 is allocated to the resource element associated with the seventh subcarrier. A reference signal assigned with the antenna port 4 is allocated to the resource element associated with the tenth subcarrier.

Similarly, regarding the fifth OFDM symbols, a reference signal assigned with the antenna port 1 is allocated to the resource element associated with the first subcarrier. A reference signal assigned with the antenna port 2 is allocated to the resource element associated with the fourth subcarrier. A reference signal assigned with the antenna port 1 is allocated to the resource element associated with the seventh subcarrier. A reference signal assigned with the antenna port 2 is allocated to the resource element associated with the tenth subcarrier.

Regarding the eighth OFDM symbol, reference signals are allocated in a similar manner to the first OFDM symbol. Regarding the ninth OFDM symbol, reference signals are allocated in a similar manner to the second OFDM symbol. Regarding the twelfth OFDM symbol, reference signals are allocated in a similar manner to the fifth OFDM symbol.

The resource elements, times, and frequencies for the respective reference signals mapped to each antenna port are identical. No signal is assigned to the resource elements associated with other antenna ports, i.e., zero (null) signals are allocated thereto. Thus, reference signals are orthogonalized among antenna ports. The number of OFDM symbols included in a resource block may be changed. For example, if a long guard interval is added, there may be six OFDM symbols in one slot. Transmission data signals or control data signals are mapped to resource elements other than the resource elements to which reference signals shown in FIG. 3 are mapped.

The number of resource blocks changes according to the frequency bandwidth (system bandwidth) used by a communication system. For example, according to the frequency bandwidth, 6 to 110 resource blocks are used in the frequency domain in some cases. Further, frequency aggregation may be used to make the entire system bandwidth greater than or equal to 110 resource blocks. For example, the entire system bandwidth is divided into multiple component carriers each including 100 physical resource blocks. A guard band is inserted between adjacent component carriers. Thus, the entire system bandwidth may include 5 component carriers, which corresponds to 500 physical resource blocks. If described by bandwidth, for example, a component carrier has 20 MHz. A guard band is inserted between adjacent component carriers. Thus, the entire system bandwidth may include 5 component carriers, which is 100 MHz.

At this time, signals based on a pseudo noise sequence are allocated to reference signals associated with at least one antenna port. Additionally, signals generated from a random number based on a cell ID are allocated to reference signals associated with the remaining antenna ports. The details thereof will be explained later. Further, for each antenna port, a transmission data signal or a control data signal is mapped to a resource element to which a reference signal is not allocated.

With reference back to FIG. 2, the OFDM signal generators 107a to 107m perform a frequency-to-time conversion process by means of IFFT (Inverse Fast Fourier Transform) or the like to convert frequency domain signals output from associated ones of the resource element mappers 106a to 106m into time domain signals. Additionally, each of the OFDM signal generators 107a to 107m cyclically expands part of each OFDM symbol to add a guard interval thereto. Further, each of the OFDM signal generators 107a to 107m converts the signal with the guard interval added, which is a digital signal, into an analog signal. Then, each of the OFDM signal generators 107a to 107m performs a conversion process to convert a baseband signal into a radio frequency signal. Then, each of the OFDM signal generators 107a to 107m transmit the radio frequency signal from an associated one of the transmission antennas 108a to 108m.

Figure 4:
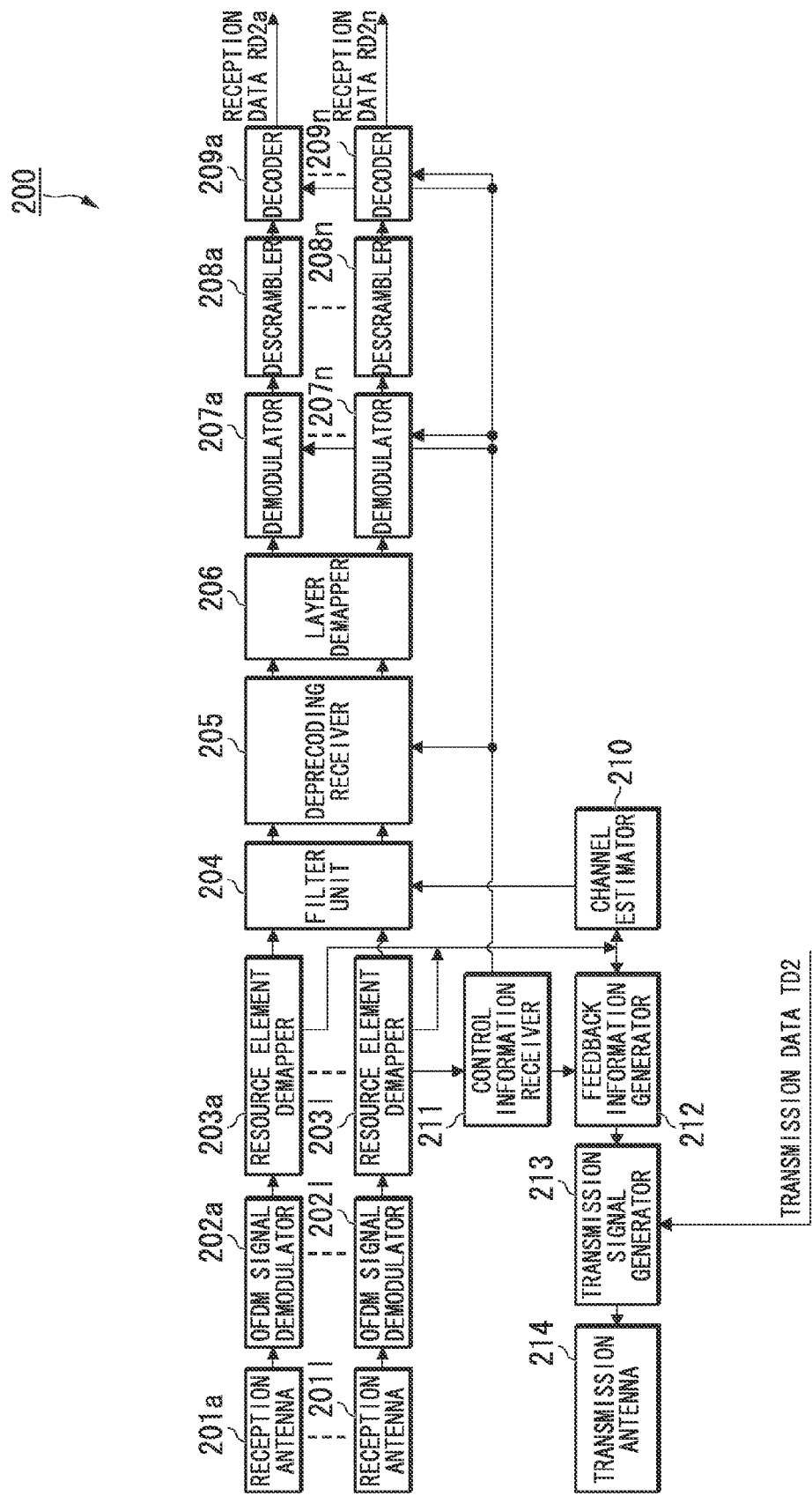
FIG. 4 is a schematic block diagram illustrating a configuration of a mobile station device 200 according to the first embodiment.

FIG. 4 is a block diagram illustrating a configuration of the mobile terminal device 200 according to the first embodiment. As shown in FIG. 4, the mobile terminal device 200 includes: reception antennas (reception antenna ports) 201a to 201l; OFDM signal demodulators 202a to 202l; resource element demappers 203a to 203l; a filter unit 204; a deprecoder 205; a layer demapper 206; demodulators 207a to 207n; descramblers 208a to 208n; decoders 209a to 209n; a channel estimator 210; a control information receiver 211; a feedback information generator 212; a transmission signal generator 213; and a transmission antenna 214. The number of the reception antennas 201a to 201l, the number of OFDM signal demodulators 202a to 202l, and the number of resource element demappers 203a to 203l are identical to the number of reception antennas. The number of the demodulators 207a to 207n, the number of the descramblers 208a to 208n, and the number of the decoders 209a to 209n are identical to the maximum number of codewords to be transmitted in parallel by the base station device 100a or 100b. In the first embodiment, the encoders 101a to 101l, the scramblers 102a to 102n, modulators 103a to 103n, the layer mapper 104, the precoder 105, the resource element mappers 106a to 106m, the OFDM signal generators 107a to 107m, and the transmission antennas 108a to 108m function as a radio transmitter.

Figure 5:
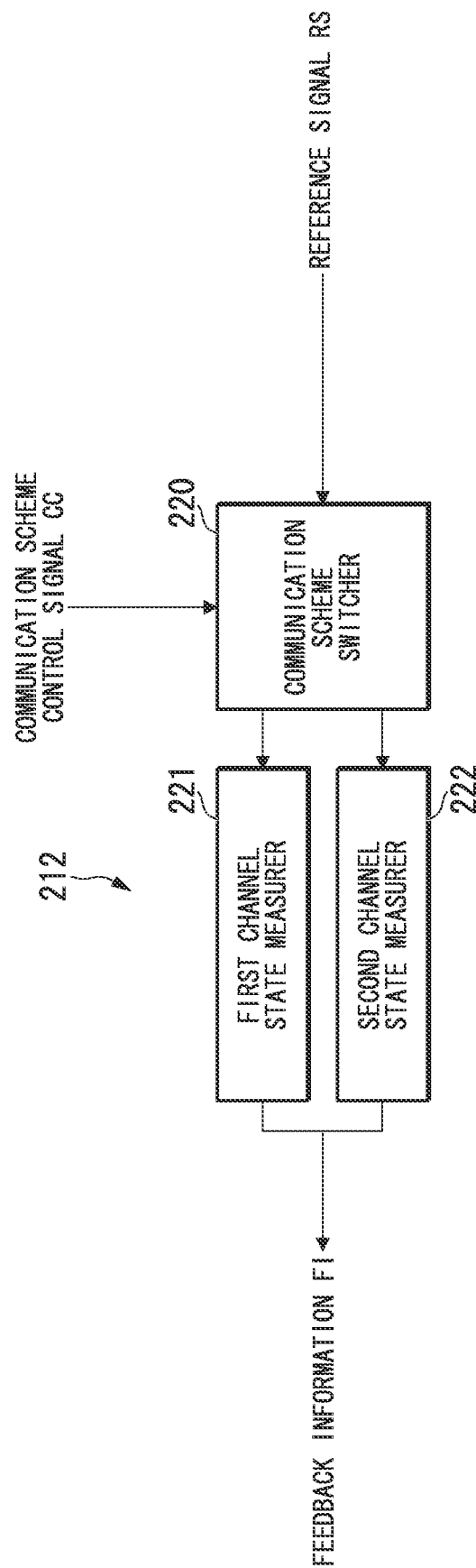
FIG. 5 is a schematic block diagram illustrating a feedback information generator 212 according to the first embodiment.

FIG. 5 is a schematic block diagram illustrating a configuration of the feedback information generator 212 according to the first embodiment. The feedback information generator 212 includes: a communication scheme switcher 220; a first channel state measurer 221; and a second channel state measurer 222.

The mobile terminal device 200 includes at least one reception antenna 201a. Each of the reception antennas 201a to 201l receives signals which are transmitted from the base station devices 100a and 100b and which pass through channels.

Each of the OFDM signal demodulators 202a to 202l performs, on the signal received by associated one of the reception antennas, a process of converting a radio frequency signal into a baseband signal, and a process of converting an analog signal into a digital signal. Then, each of the OFDM signal demodulators 202a to 202l removes the guard interval added by the base station device 100a or 100b. Then, each of the OFDM signal demodulators 202a to 202l performs a time-to-frequency conversion process by means of FFT (Fast Fourier Transform) or the like to generate frequency domain signals. The frequency domain signals generated can be expressed by the following expression (1).

(Expression 1)

$$R(k) = H(k)S(k) + N(k) \quad (1)$$

$$H(k) = \begin{bmatrix} H_{11}(k) & \cdots & H_{1N_T}(k) \\ \vdots & \ddots & \vdots \\ H_{N_R 1}(k) & \cdots & H_{N_R N_T}(k) \end{bmatrix}$$

$$S(k) = [S_1(k) \ \cdots \ S_{N_T}(k)]^T$$

$$N(k) = [N_1(k) \ \cdots \ N_{N_R}(k)]^T$$

k denotes the subcarrier number. $N_T$ denotes the number of transmission antennas. $N_R$ denotes the number of reception antennas. R(k) denotes a reception signal associated with one of the reception antennas. S(k) denotes a transmission signal associated with one of the transmission antennas. N(k) denotes noises associated with one of the reception antennas. H(k) denotes a frequency response associated with one of the reception antennas and one of the transmission antennas. $X^T$ denotes a transposed matrix of a matrix X.

If the same signals are transmitted in the same timing from the base station devices 100a and 100b when cooperative communication, such as joint processing/transmission, is performed, an element of H(k) is one resulted from combining a frequency response for a channel from the transmission antenna 108a of the base station device 100a to the reception antenna 201a of the mobile terminal device 200 and a frequency response for a channel from the transmission antenna 108a of the base station device 100b to the reception antenna 201a of the mobile terminal device 200. If phase rotation is applied to a signal to be transmitted by means of precoding or the like, the result of the phase rotation is further added to the element of H(k).

The resource element demappers 203a to 203l demap (split) the transmission data signal, the control data signal, and the reference signals, which are mapped by the base station devices 100a and 100b. Then, the resource element demappers 203a to 203l output the transmission data signal to the filter unit 204, the reference signals to the feedback information generator 212 and the channel estimator 210, and the control data signal to the control information receiver 211.

The channel estimator 210 estimates variations of amplitude and phase (frequency response, transfer function) for each resource element based on comparison of the input reference signals and known reference signals, and thus performs channel estimation. As for the resource elements to which no reference signal is mapped, the channel estimation result for the resource elements to which reference signals are mapped is interpolated in the frequency and time domains, and thus channel estimation is performed. As the interpolation method, various methods, such as linear interpolation, parabolic interpolation, polynomial interpolation, Lagrange interpolation, spline interpolation, FFT interpolation, and MMSE (Minimum Mean Square Estimation) interpolation may be used. At this time, channel estimation is performed for each of the reception antennas 108a to 108m associated with the respective transmission antennas 201a to 201l.

The filter unit 204 performs channel compensation using the channel estimation values output from the channel estimator 210 on data signals for the respective reception antennas 201a to 201l output from the associated ones of the resource element demappers 203a to 203l, and thus detects transmission signals S(k). As the detecting method, ZF (Zero Forcing) criteria, MMSE criteria, and the like may be used. For example, when weight coefficients used for detection based on the ZF criteria and the MMSE criteria are $M_{ZF}$ and $M_{MMSE}$, respectively, these weights can be expressed by the following expressions (2) and (3)

(Expression 2)

$$M_{ZF}(k) = \hat{H}^H(k)(\hat{H}(k)\hat{H}^H(k))^{-1} \quad (2)$$

$$M_{MMSE}(k) = \hat{H}^H(k)(\hat{H}(k)\hat{H}^H(k) + \hat{\sigma}^2 I_{N_R})^{-1} \quad (3)$$

$\hat{H}(k)$ denotes the frequency response estimated. $\hat{H}(k)$ denotes a complex conjugate transposed matrix. $X^{-1}$ denotes an inverse matrix of a matrix X. $\hat{\sigma}^2$ denotes the noise power. $I_{N_R}$ denotes a $N_R \times N_R$ unit matrix.

A transmission data signal for each of the transmission antennas 108a to 108m is estimated using any one of these weight coefficients M(k). When the transmission data signal estimated is $\hat{S}(k)$, the transmission data signal can be detected using the following expression (4).

(Expression 3)

$$\hat{S}(k) = M(k)R(k) \quad (4)$$

The deprecoder 205 performs, on the transmission data signals detected by the filter unit 204, a process reverse to the precoding process performed by the base station devices 100a and 100b. If the base station devices 100a and 100b perform precoding processes using CDD, the deprecoder 205 may not perform a process with respect to the CDD.

The layer demapper 206 performs a demapping process on the signals for each layer to obtain signals of codewords. The demodulators 207a to 207n are associated with the respective codewords, and receive signals of the associated codewords. Each of the demodulators 207a to 207n performs, on the signal input, demodulation associated with the modulation scheme used by a base station device of the base station devices 100a and 100b, which is a transmission source. The descramblers 208a to 208n perform, on the results of the demodulation performed by the associated demodulators 207a to 207n, descrambling processes associated with the scramble codes used by the base station devices 100a and 100b. The decoders 209a to 209n perform error correction decoding processes associated with the encoding method used by the base station device 100a and 100b, detect reception data RD2a to RD2n, and output the detected reception data to an upper layer processor (not shown) of the mobile terminal device 200.

On the other hand, the control information receiver 211 receives a control data signal output from at least one of the resource element demappers 203a to 203l, and extracts a communication scheme control signal from the received control data signal. According to the communication scheme control signal extracted, the control information receiver 211 outputs, to the feedback information generator 212, a signal indicating whether or not to generate feedback information for the mobile terminal device 200 to perform cooperative communication with a neighboring cell. Additionally, the control information receiver 211 controls the decoders 209a to 209n, the demodulators 207a to 207n, the deprecoder 205, and the filter unit 204 according to a communication parameter specified by the control data signal, such as an encoding rate, a modulation scheme, a precoding matrix, and the number of rank, which has been used for the base station devices 100a and 100b to transmit the transmission data signal.

The feedback information generator (communication parameter determining unit) 212 generates feedback information based on the reference signals output from the resource element demappers 203a to 203l. As a method of generating feedback information, a method of measuring SINR (Signal to Interference plus Noise power Ratio), SIR (Signal to Interference power Ratio), SNR (Signal to Noise power Ratio), pathloss, and the like with use of the reference signals output from the resource element demappers 203a to 203l may be used. As a unit for generating feedback information, division may be made in a frequency domain (for example, in units of subcarriers, resource elements, resource blocks, sub-bands each including multiple resource blocks, or the like), in a time domain (for example, in units of OFDM symbols, subframes, slots, radio frames, or the like), or in a spatial domain (for example, in units of antenna ports, transmission antennas, reception antennas, or the like). Further, these units may be combined.

Regarding the feedback information, as explained with respect to the adaptive control method based on the feedback information, information for specifying a recommended transmission format or information indicating a channel state may be used as the feedback information. If the information specifying a recommended transmission format is used, precoding matrix information (such as PMI) used by the precoder 105 of the base station device 100a and/or 100b in the precoding process, MCS information (such as CQI specifying an encoding rate and a modulation scheme) used by the encoders 101a to 101n and the modulators 103a to 103n of the base station device 100a and/or 100b, information regarding the number of layer (such as RI) mapped by the layer mapper 104 of the base station device 100a and/or 100b, may be used as the feedback information. If the information specifying a channel state is used, information indicating channel quality, such as SINR, among channel states measured by the mobile terminal device 200 may be used as the feedback information.

At this time, the feedback information generator 212 generates feedback information FI according to the communication scheme control signal CC extracted by the control information receiver 211. Firstly, the communication scheme control signal CC output from the communication information receiver 211 is input to the communication scheme switcher 220 shown in FIG. 5. The communication scheme switcher 220 selects one of the first channel state measurer 221 and the second channel state measurer 222 based on the communication scheme control signal CC. Then, the communication scheme switcher 220 outputs the reference signals RS received from the resource element demappers 203a to 203l to the selected one of the first and second channel state measurers 221 and 222. If the communication scheme control signal CC indicates that feedback information for performing cooperative communication with a neighboring cell is not to be generated, the communication scheme switcher 220 selects the first channel state measure 221. If the communication scheme control signal CC indicates that feedback information for performing cooperative communication with a neighboring cell is to be generated, the communication scheme switcher 220 selects the second channel state measure 222.

If the first channel state measurer 221 is selected, in other words, if feedback information for performing cooperative communication with a neighboring cell is not to be generated, the reference signals RS are input to the first channel state measurer 221. Then, the first channel state measurer 221 measures a channel state regarding each of the reference signals as an independent signal, and thus generates feedback information FI. In other words, the first channel state measurer 221 measures a channel state including interferences due to signals transmitted from another base station device. The channel state means information concerning a channel response such as a frequency response indicating a variation of amplitude and/or phase, information concerning channel quality such as SNR and SINR, and the like.

If the second channel state measurer 222 is selected, in other words, if feedback information for performing cooperative communication with a neighboring cell is to be generated, the reference signals RS are input to the second channel state measurer 222. Then, the second channel state measurer 222 performs a despreading process (an inverse spreading process) on the reference signals RS, measures a channel state, and thus generates feedback information. In other words, the second channel state measurer 222 measures channel states that interferences due to signals transmitted from another base station device are reduced. The details of the second channel state measurer 222 generating the feedback information FI will be explained later. For example, the first channel state measurer 221 calculates SNR indicating channel quality using the reference signals RS, and regards the calculated SNR as the feedback information FI.

The despreading process means a process of autocorrelating arbitrary signals known to the base station devices 100a and 100b and the mobile station device 200, i.e., the reference signals, in units for, for example, generating feedback information. Alternatively, an autocorrelation value may be obtained with respect to arbitrary signals (such as signals generated from random numbers). Preferably, the reference signals are generated based on a pseudo noise sequence. This is because an autocorrelation value in that case becomes better. A unit for generating feedback information may be different from that for performing the despreading process.

To transmit (feed back) the feedback information FI output from the feedback information generator 212 to the base station devices 100a and 100b, the transmission signal generator 213 performs an encoding process, a modulation process, an OFDM signal generation process, and the like on the feedback information FI as well as the transmission data TD2 to generate a transmission signal.

The transmission antenna 214 transmits, to the base station devices 100a and 100b through uplink, the transmission signal including the feedback information generated by the transmission signal generator 213. The feedback information may be transmitted to one of or both the base station devices 100a and 100b according to a state of the area where the mobile station device 200 is present.

As an example of generation and mapping of reference signals, generation of reference signals based on a pseudo noise sequence which is performed by the reference signal generator 114 of each of the base station devices 100a and 100b, and mapping of the reference signals generated in units of two sequential resource blocks in the time domain which is performed by the resource element mappers 106a to 106m, are explained in the first embodiment.

Figure 6A:
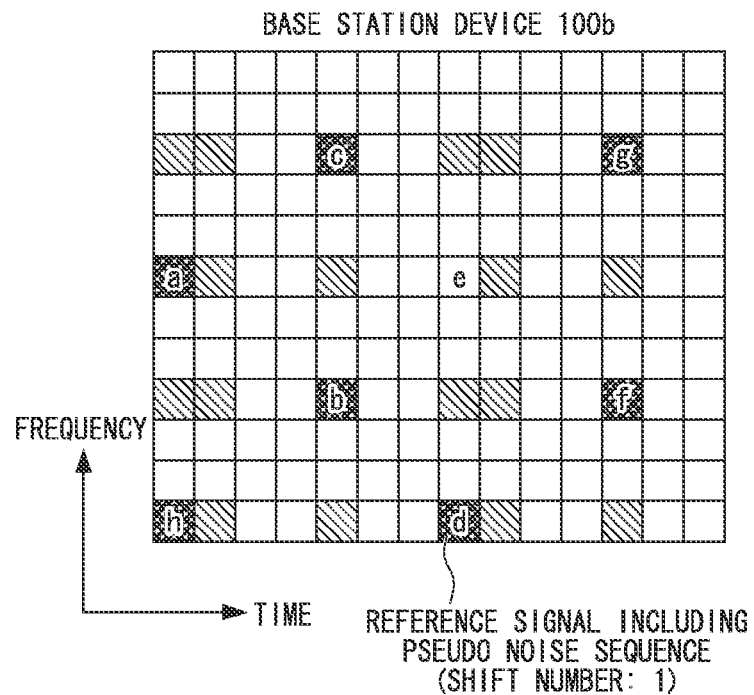
FIG. 6A is a diagram illustrating an example of reference signals and mapping thereof according to the first embodiment.
Figure 6B:
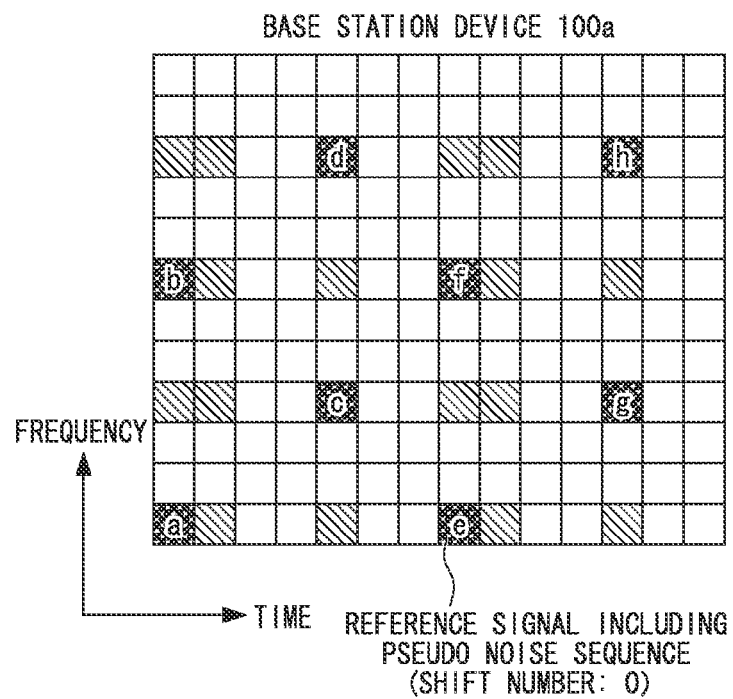
FIG. 6B is a diagram illustrating an example of reference signals and mapping thereof according to the first embodiment.

FIGS. 6A and 6B are diagrams illustrating examples of reference signals and mapping thereof according to the first embodiment. This drawing shows a case where reference signals (8 chips (bits)) to be assigned to the antenna port 1 among the four antenna ports is generated based on a pseudo noise sequence. Here, only the reference signals to be assigned to the antenna port 1 are focused on, and resource elements to be allocated with reference signals assigned to the antenna ports 2 to 4 shown in FIG. 3 are hatched with diagonal lines.

A case is explained, in which a sequence with excellent autocorrelation characteristics such as an M sequence (in other words, a sequence such that when a despreading process is performed, a sharp (high) correlation value (peak value) can be obtained if the sequences are synchronized, and a very low correlation value can be obtained if the sequences are out of synchronization) is used. Regarding an 8-chip sequence a to h, a sharp correlation value can be obtained at the position of a. In other words, a correlation value between a sequence "a, b, c, d, e, f, g, h" and a sequence "a, b, c, d, e, g, h" becomes the maximum value. For example, a correlation value between a sequence "a, b, c, d, e, f, g, h" and a sequence "h, a, b, c, d, e, f, g" becomes much smaller than the aforementioned maximum value.

Accordingly, for neighboring cells (the base station device 100a and the base station device 100b), the 8-chip sequence a to h is cyclically shifted and used as reference signals By cyclically shifting the sequence, the position at which the peak correlation value is obtained can be differentiated for each cell. In the first embodiment, the resource elements to which the resource element mapper 106a of the base station device 100a maps reference signals are the same as those to which the resource element mapper 106a of the base station device 100b maps reference signals.

The reference signal generator 114 of the base station device 100a generates, as reference signals associated with the antenna port 1, signals based on a pseudo noise sequence, that is, a sequence "a, b, c, d, e, f, g, h" that is obtained by shifting, by 0 chip, the sequence a to h that is the pseudo noise sequence. The resource element mapper 106a of the base station device 100a maps the generated reference signals sequentially from the chip a, as shown in FIG. 6A.

The reference signal generator 114 of the base station device 100b generates, as reference signals associated with the antenna port 1, signals based on a pseudo noise sequence, that is, a sequence "h, a, b, c, d, e, f, g" that is obtained by shifting, by 1 chip, the sequence a to h that is the pseudo noise sequence. The resource element mapper 106a of the base station device 100b maps the generated reference signals sequentially from the chip h, as shown in FIG. 6B.

Next, effects achieved by performing the mapping as shown in FIGS. 6A and 6B are explained here. Firstly, to compare with the method of the present invention, a case is explained, in which the mobile terminal device 200 that performs cooperative communication with the base station devices 100a and 100b generates feedback information pieces with respect to the respective base station devices 100a and 100b based on channel states estimated using each of the reference signal independently. If each of the base station devices (cells) performs estimation using each of the reference signals independently based on random numbers generated from the unique ID number that identifies the associated base station device (cell), there causes inter-cell interferences. Particularly, the mobile terminal device 200 present in a cell edge region generates feedback information based on channel states estimated under the condition that inter-cell interferences are large.

Further, if the mobile terminal device 200 present in the cell edge region tries to perform cooperative communication, although depending on a cooperative communication method, it is necessary for the mobile terminal device 200 to generate feedback information pieces with respect to the respective base station devices 100a and 100b with which the mobile terminal device 200 tries to perform cooperative communication. However, inter-cell interferences for data transmission is suppressed or reduced when the mobile terminal device 200 performs cooperative communication. For this reason, the channel state estimated for generating feedback information is the state in which inter-cell interferences are large, which greatly differs from the state in which inter-cell interferences are suppressed or reduced when cooperative communication is actually being performed. As a result, if each of the reference signals is independently used for performing estimation, adequate feedback information for performing cooperative communication cannot be obtained.

As a method of solving such a problem, it can be considered that reference signals dedicated for cooperative communication are arranged so as not to match between neighboring cells (so that frequencies and times do not match), and that zero (null) signals are allocated to resource elements for one cell to which reference signals for the other cell are allocated. Thus, the reference signals become orthogonalized between the neighboring cells. Accordingly, when the mobile terminal device 200 performs cooperative communication, the mobile terminal device 200 can estimate channel states while removing inter-cell interferences, and generate adequate feedback information for performing cooperative communication. If such a method is used, however, the number of resource elements to be allocated with reference signals increases, and the number of resource elements to be allocated with transmission data signals decreases, thereby causing a problem in that the transmission efficiency decreases.

On the other hand, in the present invention, since reference signals are mapped in a manner as shown in FIGS. 6A and 6B, the mobile terminal device 200 can simultaneously receive reference signals from the base station devices 100a and 100b. Additionally, when the mobile terminal device 200 performs cooperative communication, the mobile terminal device 200 performs a despreading process. Consequently, the position of the peak value obtained from the reference signals transmitted from each base station device differs between the base station devices 100a and 100b. Therefore, inter-cell interferences can be suppressed without allocating zero (null) signals to resource elements to which reference signals for the other base station device are allocated so that the positions of the reference signals do not match between the base station devices 100a and 100b, that is, without decreasing the transmission efficiency. Accordingly, the mobile terminal device 200 can generate adequate feedback information for performing cooperative communication.

Additionally, when the mobile terminal device 200 does not perform cooperative communication, even if reference signals are based on a pseudo noise sequence, the mobile terminal device 200 uses each of the reference signals independently as in the conventional case. Thereby, when cooperative communication is not performed, the mobile terminal device 200 can generate adequate feedback information without adding an additional process. Further, when the mobile terminal device 200 does not perform cooperative communication, it is not necessary to measure all the reference signals for a neighboring cell in order to measure the interference power from the neighboring cell. Moreover, adequate feedback information can be generated without newly notifying the mobile terminal device 200 of those control data pieces. Additionally, adequate feedback information can be generated without changing the configuration of reference signals between when the mobile terminal device 200 performs cooperative communication and when the mobile terminal device 200 does not perform cooperative communication, and without increasing a radio of reference signals with respect to the entire resources (overhead).

Although the case, in which a sequence with excellent autocorrelation characteristics such as the M sequence is shifted between neighboring cells to orthogonalize reference signals, has been explained with reference to FIGS. 6A and 6B, the configuration is not limited thereto. For example, a sequence with excellent autocorrelation characteristics, such as a Hadamard code, may be used. In this case, the Hadamard code is not cyclically shifted between neighboring cells, but reference signals based on a pseudo noise sequence are orthogonalized between neighboring cells. The orthogonalization of reference signals can be achieved by various methods. For example, a method for an upper layer controller of each of the base station devices 100a and 100b to perform allocation, a method for base station devices to cooperate with each other through a line for communicating a control signal, such as an X2 interface or wirelessly cooperate with each other, a method for each of the base station devices 100a and 100b to generate reference signals by a predetermined method using parameters such as a cell ID, and the like, may be used. The X2 interface means a wired line (channel) for connecting base station devices located adjacently or peripherally so that a control signal, a data signal, and the like are bilaterally communicated through the wired line.

The base station device 100a or 100b may notify the mobile terminal device 200 of the pseudo noise sequence used, the reference signals used, the shift number, the predetermined indexes (numbers) of reference signals, and the like. Alternatively, the mobile terminal device 200 may be configured to specify a pseudo noise sequence and the shift number with use of parameters, such as a cell ID, which are reported by the base station devices 100a and 100b.

Even when the mobile terminal device 200 is performing cooperative communication, a base station device that transmits a control data signal to the mobile terminal device 200 and a base station device to which the mobile terminal device 200 transmits feedback information may be any one of the base station devices 100a and 100b, such as an anchor cell that is performing cooperative communication. Alternatively, even when the mobile terminal device 200 is performing cooperative communication, both the base station devices 100a and 100b, which are performing cooperative communication, may transmit a control data signal to the mobile terminal device 200 and receive feedback information from the mobile terminal device 200.

Figure 7A:
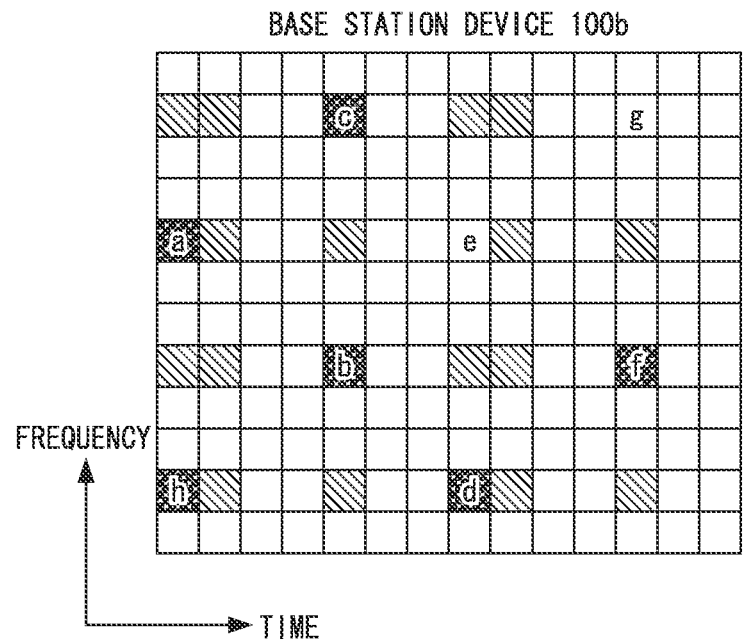
FIG. 7A is a diagram illustrating another example of reference signals and mapping thereof according to the first embodiment.
Figure 7B:
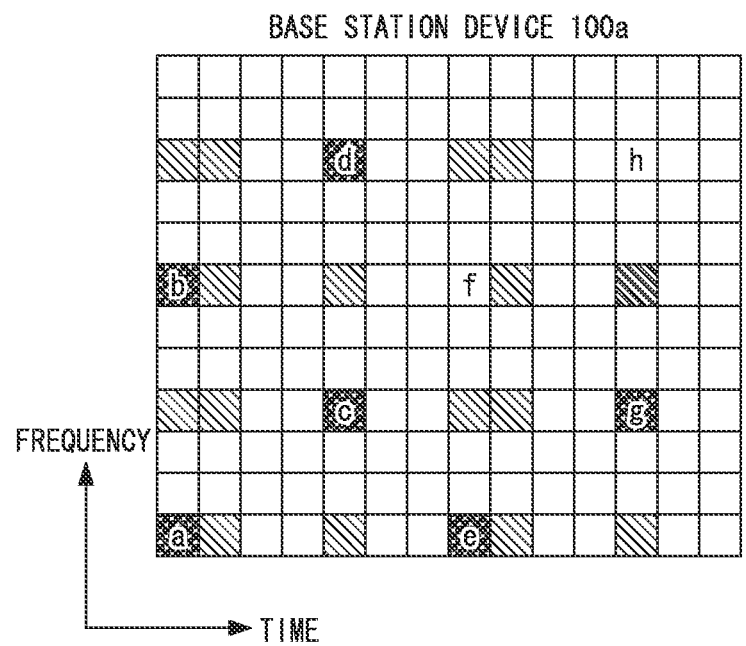
FIG. 7B is a diagram illustrating another example of reference signals and mapping thereof according to the first embodiment.

The case, in which the resource elements to which the base station device 100a maps reference signals are the same as those to which the base station device 100b maps reference signals, is explained with reference to FIGS. 6A and 6B, similar effects can be achieved in another example as shown in FIGS. 7A and 7B where resource elements to which the base station devices 100a and 100b map reference signals are shifted based on parameters, such as a cell ID. FIGS. 7A and 7B show the case where the resource elements to which the base station device 100b maps reference signals are shifted by one subcarrier in the frequency domain compared to the resource elements to which the base station device 100a maps reference signals. Even in this case, the mapping is performed in a similar manner as shown in FIGS. 6A and 6B. At this time, as for the mobile terminal device 200, reference signals are not orthogonalized. However, the mobile terminal device 200 performs a despreading process using a sequence with sharp autocorrelation characteristics as a pseudo noise sequence, thereby greatly reducing inter-cell interferences. Accordingly, the mobile terminal device 200 can generate adequate feedback information for performing cooperative communication.

Figure 8:
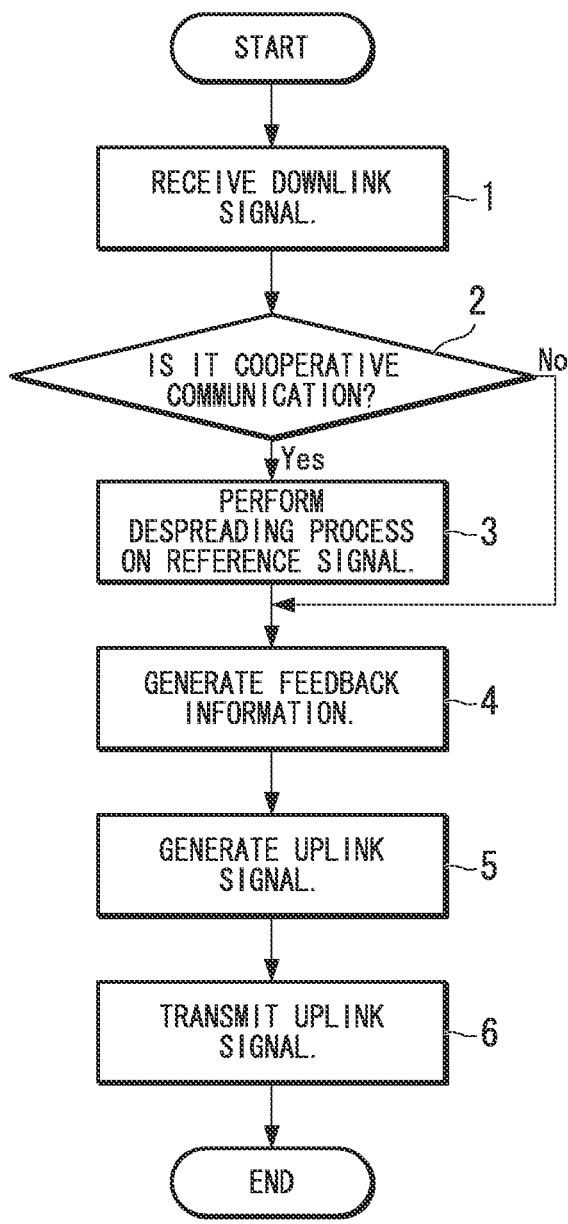
FIG. 8 is a flowchart illustrating a feedback information generating process performed by a mobile terminal device 200 according to the first embodiment.
Figure 10A:
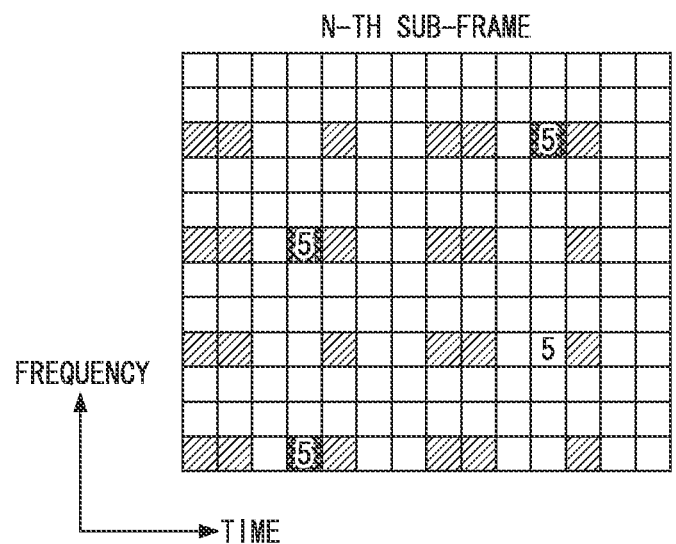
FIG. 10A is a diagram illustrating an example of the arrangement of reference signals according to the second embodiment.
Figure 10B:
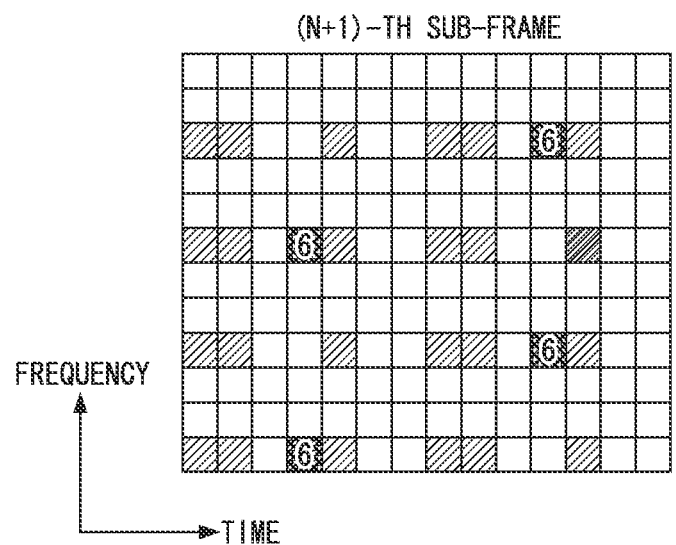
FIG. 10B is a diagram illustrating an example of the arrangement of reference signals according to the second embodiment.
Figure 10C:
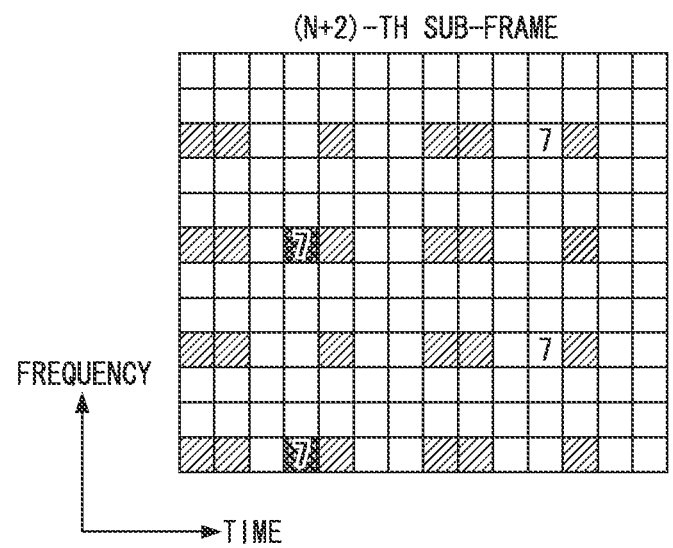
FIG. 10C is a diagram illustrating an example of the arrangement of reference signals according to the second embodiment.
Figure 10D:
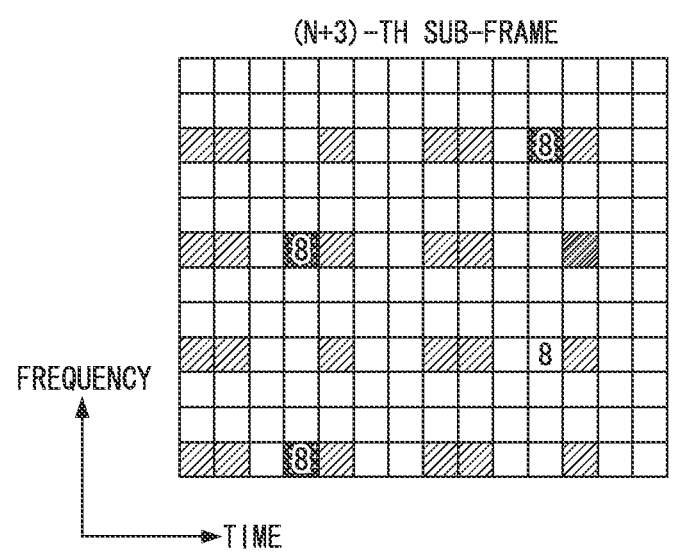
FIG. 10D is a diagram illustrating an example of the arrangement of reference signals according to the second embodiment.
Figure 11A:
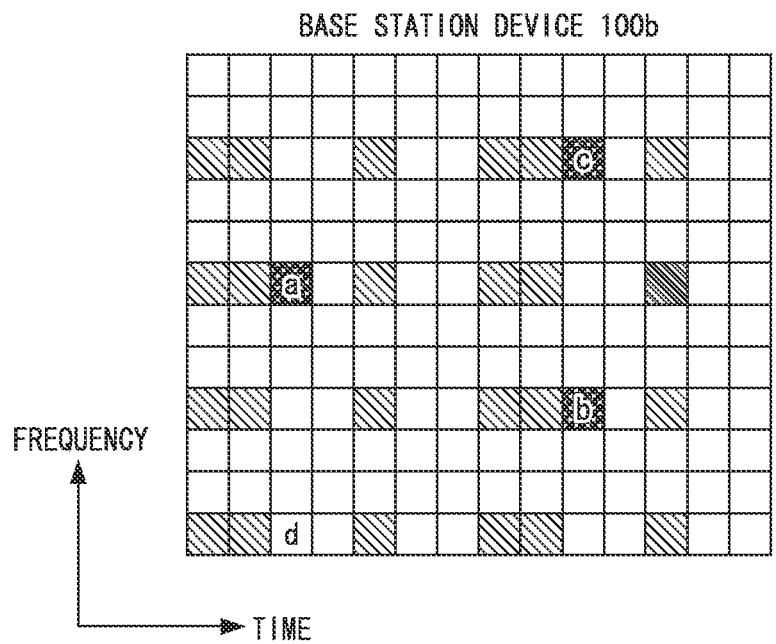
FIG. 11A is a diagram illustrating an example of the arrangement of reference signals generated by cyclically shifting a sequence according to the second embodiment.
Figure 11B:
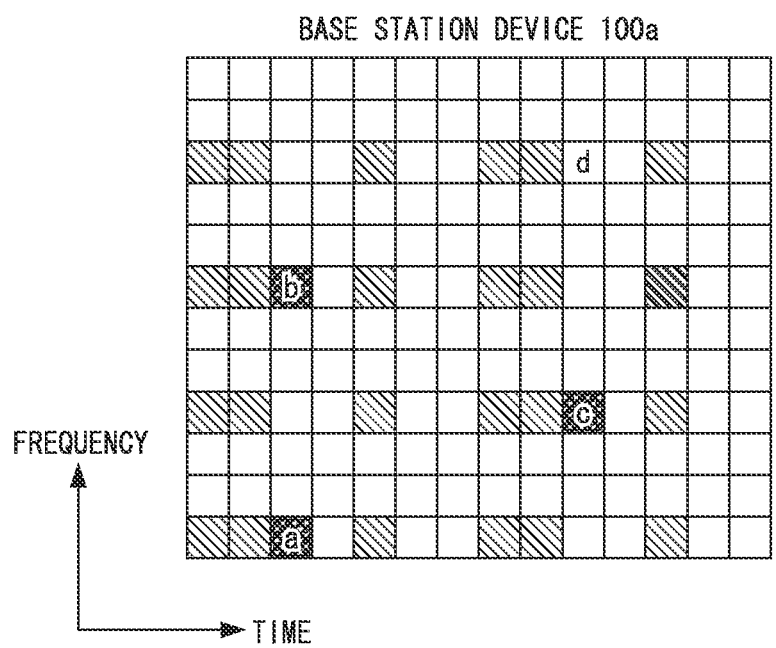
FIG. 11B is a diagram illustrating an example of the arrangement of reference signals generated by cyclically shifting a sequence according to the second embodiment.
Figure 12A:
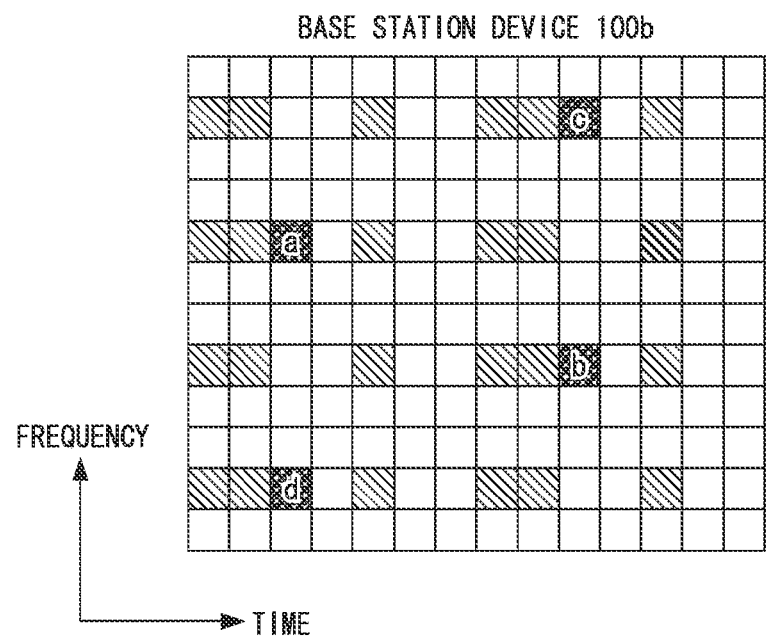
FIG. 12A is a diagram illustrating another example of the arrangement of reference signals generated by cyclically shifting a sequence according to the second embodiment.
Figure 12B:
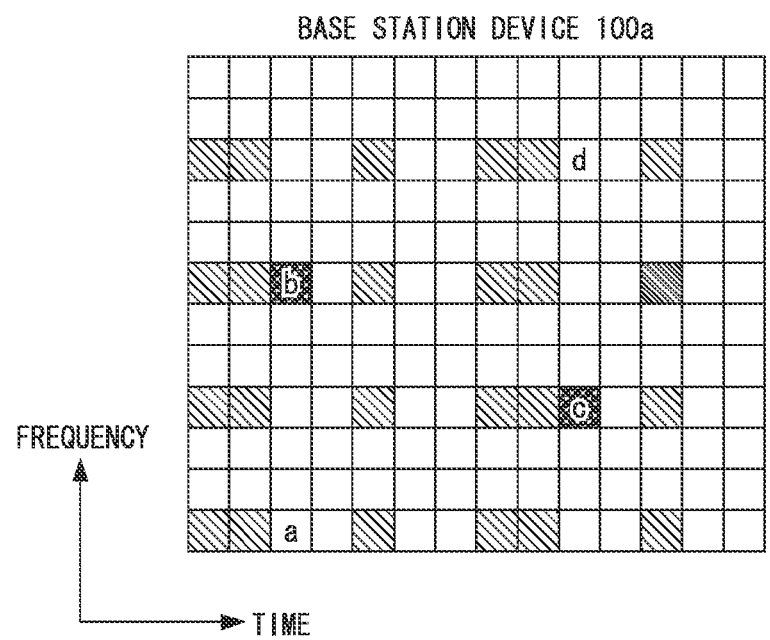
FIG. 12B is a diagram illustrating another example of the arrangement of reference signals generated by cyclically shifting a sequence according to the second embodiment.

FIG. 8 is a flowchart illustrating a feedback information generating process performed by the mobile terminal device 200 according to the present invention. The mobile terminal device 200 receives a communication scheme control signal as part of a control data signal from the base station device 100a or 100b. Here, the base station device 100a or 100b multiplexes, as part of a control data signal, the communication scheme control signal with a transmission data signal, and transmits the multiplexed control signal. However, the base station device 100a or 100b may transmit the communication scheme control signal using an upper layer signal (such as an RRC signaling (radio resource control signal) or system information reported through a broadcast channel). Upon receiving the communication scheme control signal, the mobile terminal device 200 generates feedback information using a scheme specified by the communication scheme control signal.

In step S1, the mobile terminal device 200 receives a downlink signal transmitted from at least one base station device. In step S2, the mobile terminal device 200 determines based on the communication scheme control signal whether to generate feedback information for performing cooperative communication with a neighboring cell or to generate feedback information for performing communication with a serving cell. If the mobile terminal device 200 determines to generate feedback information for performing cooperative communication with a neighboring cell, the routine proceeds to step S3. In step S3, the mobile station device 200 performs a despreading process on the received reference signals, and then the routine proceeds to step S4.

On the other hand, if the mobile terminal device 200 determines in step S2 to generate feedback information for performing communication with a serving cell, the routine proceeds to step S4. In step S4, if the mobile terminal device 200 generates feedback information for performing cooperative communication with a neighboring cell, that is, if the mobile terminal device 200 has performed the despreading process in step S3, the mobile terminal device 200 generates feedback information using the reference signals having been subjected to the despreading process. On the other hand, if the mobile terminal device 200 generates feedback information for performing cooperative communication with a serving cell (if the mobile terminal device 200 generates feedback information other than that for performing cooperative communication with a neighboring cell), that is, if the mobile terminal device 200 has not performed the despreading process in step S3, the mobile terminal device 200 generates feedback information using the reference signals as independent signals.

Then, in step S5, the mobile terminal device 200 generates an uplink signal for transmitting the feedback information generated to the at least one base station device. An uplink signal format is set upon setting of the feedback information. The uplink signal format defines resources and a feedback period for a physical uplink control channel PUCCH or a physical uplink shared channel PUSCH for transmitting feedback information, bit sequences of RI, PMI, and CQI, and the like. In step S6, the mobile terminal device 200 transmits the uplink signal generated. The generation of feedback information is performed periodically or non-periodically according to the timing of transmitting feedback information. If setting of feedback information from the base station device is suspended, the flow for the mobile terminal device 200 to generate feedback information is terminated.

Hereinafter, the detailed procedure for the feedback information generator 212 to generate feedback information if the mobile terminal device 200 performs a despreading process is explained.

The base station device 100a notifies the mobile terminal device 200 of a set of cells with which the mobile terminal device 200 is to perform cooperative communication, that is, a set of cells for which the mobile terminal device 200 performs a despreading process. The information concerning the set of cells includes the number of cells, cell IDs of the respective cells, and pseudo noise sequences for the respective cells. The pseudo noise sequences for the respective cells may be previously determined based on cell IDs or the like. The base station device 100a uses a measurement report obtained from the mobile terminal device 200 in order to determine a set of cells with which cooperative communication is to be performed. When the mobile terminal device 200 is notified of the set of cells for which a despreading process is to be performed, the feedback information generator 212 of the mobile terminal device 200 performs a despreading process on reference signals transmitted from each of the cells.

Firstly, a procedure for the feedback information generator 212 to calculate CQI, PMI, and RI as feedback information, based on SINR is explained hereinafter. CQI and PMI may be previously defined as multiple types of patterns (indexes), and the closest one of the patterns may be selected. CQI is determined in the following manner. To determine CQI, a look-up table of CQI (combinations of encoding rates and modulation schemes) satisfying predetermined quality (such as a bit error rate) with respect to SINR is previously defined. The feedback information generator 212 calculates SINR at the time of performing cooperative communication from the results of the despreading process, and determines CQI associated with the SINR from the look-up table.

RI is determined in the following manner. RI is determined based on the number of layers satisfying predetermined quality with respect to SINR. In consideration of CQI and RI at the same time, for example, a look-up table including combinations of CQI and RI satisfying predetermined quality (a bit error rate and the like) with respect to SINR is defined previously, and RI may be determined with reference to the look-up table so as to satisfy the predetermined quality. The PMI is determined in the following manner. When PMI is determined, a precoding matrix achieving the maximum reception power is determined with use of the results of the despreading process. When CQI and RI are determined, PMI may be determined first, and then CQI and RI may be determined based on a channel in consideration of the determined PMI. The order of generating feedback information is not limited thereto.

When CSI is to be further transmitted as feedback information, channel states (values of variation of amplitude and phase, frequency responses) for reception antenna ports associated with the respective transmission antenna ports are calculated from the results of the despreading process. A compressing process using various compressing methods is performed on the feedback information based on CSI, thereby reducing the amount of the feedback information. For example, the deference between sequential channel states in the time or frequency domain may be regarded as the feedback information. Additionally, the feedback information may be calculated for each sub-band with a predetermined bandwidth.

To generate a channel state that is a basis for generating feedback information, there are the following two methods. In the first method, that is, a method of calculating comprehensive SINR, or CQI, PMI, and RI based on and the comprehensive SINR, the mobile terminal device 200 combines reference signals for each cell obtained by performing a despreading process, measures a channel state based on the one combined reference signal, and feeds back the combined channel state, or CQI, PMI, and RI based on the combined channel state.

In the second method, that is, a method of calculating SINR for each base station device, or CQI, PMI, and RI based on the SINR for each base station device, the mobile terminal device 200 measures channel states for respective reference signals for each cell which are obtained by performing a despreading process, and feeds back the channel states for required ones of the cells. Here, the channel state can be expressed by a value of variation of phase and amplitude with respect to a signal for each resource (such as a resource element or a resource block). The mobile terminal device 200 may be configured to have any one of the first and second methods depending on cooperative communication to be performed. Alternatively, the mobile terminal device 200 may be configured to have both the first and second methods, and perform feedback by a method specified by the base station.

Here, an example of feedback information to be preferably notified of with respect to each scheme of cooperative communication (joint transmission/processing, coordinated scheduling/beamforming) is explained. As for joint transmission/processing, the base station devices 100a and 100b that perform cooperative communication share all or part of transmission data signals (codewords) to be transmitted to the mobile terminal device 200, and performs cooperative communication (including simultaneous transmission from the base stations that perform cooperative communication, and transmission dynamically switched between the base stations that perform cooperative communication). As for the coordinated scheduling/beamforming, transmission data signals (codewords) to be transmitted to the mobile terminal device 200 are not shared by the base station devices 100a and 100b that perform cooperative communication, and are transmitted from one of the base station devices (an anchor base station, a serving base station). However, information concerning interferences and beams between the base station devices 100a and 100b that perform cooperative communication are shared therebetween.

Feedback information is generated by using the first method when joint transmission/processing is performed, and when the base station devices 100a and 100b, which perform cooperative communication, perform the same precoding process, such as when the base station devices 100a and 100b transmit the same transmission data signals (codewords) and perform spatial frequency block coding (SFBC). In other words, since the base station devices 100a and 100b transmit the same signals, the feedback information generator 212 of the mobile terminal device 200 selects a precoding, such as an encoding rate, an adaptive scheme, the rank number, or a block code, which satisfies desired quality (such as a bit error rate), based on SINR in the state in which a channel from the base station device 100a and a channel from the base station device 100b are combined.

Additionally, PMI is generated by the second method, and other feedback information is generated by the first method when each of the base station devices 100a and 100b performs the precoding process independently, such as when the base station devices 100a and 100b that perform cooperative communication transmit the same transmission data signals while applying the phase difference between the base station devices 100a and 100b. Further, feedback information is generated by using the second method when the base stations that perform cooperative communication transmit different transmission data signals (codewords) (i.e., when the base stations perform MIMO transmission).

When coordinated scheduling/beamforming is performed, only the feedback information with respect to an anchor base station (for example, the base station device 100a) is generated. At this time, signals transmitted from another base station (for example, the base station device 100b) that performs cooperative communication are estimated as interference signals. Then, the feedback information is generated in consideration of the interference signals.

Thus, by use of the invention explained in the first embodiment, even when the mobile terminal device 200 moves to a cell central region or a cell edge region, adequate feedback information can be always generated by changing a method of generating feedback information used for communication with a single base station device 100a or feedback information used for cooperative communication with multiple base station devices 100a and 100b.

Although the case, in which signals based on a pseudo noise sequence are used for all the resource elements to which reference signals associated with the respective antenna ports are mapped, has been explained above, the reference signals based on the pseudo noise sequence may be mapped to part of the resource elements. For example, signals based on a pseudo noise sequence may be allocated to reference signals associated with at least one antenna port, and signals generated from random numbers based on cell IDs may be allocated to reference signals associated with the remaining antenna ports.

Although the case where the number of antenna ports is 4 has been explained above, the present invention is applicable to any cases as long as the number of antenna ports is one or more.

The case, in which the positions of resource elements to which reference signals are to be mapped are shifted between neighboring cells based on cell IDs or the like, has been explained above. However, the positions thereof may be fixed among all cells or multiple cells that perform cooperative communication, such as an active CoMP set.

Although the case where reference signals are allocated to all resource blocks has been explained, reference signals may be allocated to only a part of the resource blocks.

As a unit of a combination of cells that orthogonalize reference signals based on a pseudo noise sequence, a unit for a base station, such as an RRE (Remote Radio Equipment), an RRH (Remote Radio Head), or an independent antenna, to perform control through a wire, such as an optical fiber; a unit for a relay base station or the like to perform wireless control; a unit configured by multiple base stations that perform cooperative communication, such as an active CoMP set; a unit of resource elements to which reference signals are mapped, and the like, may be used.

Various identification, various control, and the like for performing communication can be performed with use of the type of a pseudo noise sequence, the position of the peak of autocorrelation characteristics, and the like.

The length of the pseudo noise sequence used by each of the base station devices 100a and 100b may differ from the length of the sequence to be used for the mobile terminal device 200 to perform a despreading process.

Although it has been explained that the despreading process is performed on the reference signals in order to generate feedback information, the results of the despreading process may be used for channel estimation for demodulating transmission data signals.

Although the case, in which multiple base station devices 100a and 100b cooperatively communicate with one mobile terminal device 200, has been explained above, there are various embodiments regarding base station devices that cooperate with one another. The present invention is applicable to, for example: cooperative communication among physically-independent base station devices; cooperative communication among sectors served by one base station device having a sector configuration; cooperative communication between a transmission device (such as RRE or RRH) and a base station device that are connected to each other by wires, such as optical fibers; and cooperative communication between a transmission device (such as a relay station and a repeater station) wirelessly connected to a base station device by using relay technology. Further, those examples may be combined to perform cooperative communication. If these transmission devices have multiple antennas (antenna ports), part of the transmission antennas may be used to perform communication. Moreover, among these transmission devices, multiple antenna ports may be cooperated to communicate with at least one mobile terminal device.

The method has been explained above, in which multiple transmission devices cooperate with one another to communicate with one mobile terminal device 200, the mobile terminal device 200 generates feedback information by performing a despreading process if performing cooperative communication, and generates feedback information without performing a despreading process if communicating with a single transmission device without performing cooperative communication. However, the configuration is not limited thereto. For example, if the mobile terminal device 200 performs cooperative communication, the mobile terminal device 200 performing cooperative communication may generate feedback information by performing a despreading process. Meanwhile, if the mobile terminal device 200 performs MIMO (Multi Input Multi Output) communication, the mobile terminal device 200 may generate feedback information without performing a despreading process.

Additionally, if the mobile terminal device 200 simultaneously receives reference signals from multiple base station devices 100a and 100b while performing cooperative communication, the mobile terminal device 200 performs a despreading process on the reference signals transmitted from the base station devices 100a and the reference signals transmitted from the base station device 100b. Thereby, the mobile terminal device 200 can measure the signal power (signal amplitude) achieved by the base station device 100a and the signal power achieved by the base station device 100b while suppressing inter-cell interferences. Accordingly, based on the signal power (signal amplitude) achieved by the base station device 100a and the signal power achieved by the base station device 100b, the mobile terminal device 200 can estimate adequate feedback information for performing cooperative communication (such as comprehensive SINR, CQI, PMI, and RI based on the comprehensive SINR, SINR for each base station, and CQI, PMI, and RI based on the SINR for each base station).

If the mobile terminal device 200 does not perform cooperative communication, the mobile terminal device 200 refers to the reference signals transmitted from the base station device (the associated base station, the associated cell, the serving cell) 100a in communication, performs a despreading process for the associated base station, and thereby can measure the signal power (signal amplitude) achieved by the associated base station while suppressing inter-cell interferences. Additionally, each of chips of reference signals includes elements of interferences due to signals transmitted from a neighboring base station. For this reason, the mobile terminal device 200 refers to the resource elements to which the reference signals are mapped (calculates a square of a norm of the difference between the amplitude of the reference signal transmitted from the associated station and the reception signal), and thereby can obtain the average interference signal power. Accordingly, the mobile terminal device 200 can generate adequate feedback information (such as SINR, and CQI, PMI, and RI based on the SINR).

It has been explained that the base station controls whether or not the mobile terminal device 200 generates feedback information for performing cooperative communication with a neighboring cell. However, the mobile terminal device 200 may control the switching.

Second Embodiment

Hereinafter, a second embodiment of the present invention is explained. A wireless communication system according to the present invention includes similar base station devices 100a and 100b and a similar mobile terminal device 200 to those included in the communication system of the first embodiment. Among the resource element mappers 106a to 106m of the base station device 100a, a mapping method for the resource element mappers associated with the antenna ports 5 to 8 differ. Hereinafter, the portions differing from those of the first embodiment are mainly explained.

A case, in which the base station devices 100a and 100b add more antenna ports to antenna ports P1a to P4a and P1b to P4b which support the mobile terminal device 200 that communicates with only the base station devices 100a and 100b, as shown in FIG. 9, is explained in the second embodiment. Added antenna ports P5a to P8a and P5b to P8b support both the case where the mobile terminal device 200 communicates with only the base station device 100a or 100b, and the case where the mobile terminal device 200 performs cooperative communication with a neighboring base station device.

Here, generation of reference signals based on a pseudo noise sequence, which is performed by each of the reference signal generators 114 of the base station devices 100a and 100b, and mapping of the reference signals generated in units of two sequential resource blocks in the time domain, which is performed by the resource element mappers 106a to 106m, are explained.

Particularly, in the second embodiment, a case, in which reference signals associated with one of the antenna ports P5a to P8a and P5b to P8b are allocated to one sub-frame, and the reference signals are allocated in a cyclic manner in the time domain (for each sub-frame), is explained.

FIGS. 10A to 10D are diagrams illustrating examples of allocation of reference signals according to the second embodiment. These drawings show a case where reference signals (4 chips (bits)) to be allocated to the antenna ports P5a to P8a and P5b to P8b to be newly added are generated based on a pseudo noise sequence, and the reference signals are respectively allocated to the n-th to (n+3)-th sub-frames. In the n-th sub-frame (FIG. 10A), reference signals associated with the antenna port 5 are allocated to the first and seventh subcarriers of the fourth OFDM symbols, and the fourth and tenth subcarriers of the eleventh OFDM symbols. In the (n+1)-th sub-frame (FIG. 10B), reference signals associated with the antenna port 6 are allocated to the resource elements to which the reference signals associated with the antenna port 5 are allocated in the n-th sub-frame. Similarly, in the (n+2)-th sub-frame (FIG. 10C), reference signals associated with the antenna port 7 are allocated to the similar resource elements. In the (n+3)-th sub-frame (FIG. 10D), reference signals associated with the antenna port 8 are allocated to the similar resource elements. In other words, reference signals associated with each antenna port are allocated in cycles of 4 sub-frames.

Here, a case, in which a sequence with excellent autocorrelation characteristics, such as an M sequence, is used as a pseudo noise sequence, is explained. As shown in FIGS. 11A, 11B, 12A, 12B, 13A, and 13B, sequences obtained by cyclically shifting the sequence may be used as reference signals for neighboring cells. These drawings show a case where mapping is performed with respect to the antenna ports P5a and P5b of the base station devices 100a and 100b, respectively. In the cases of FIGS. 11A, 11B, 12A, and 12B, resource elements to which reference signals associated with the antenna ports P5a to P8a and P5b to P8b are mapped are determined based on cell IDs or the like, similarly to the antenna ports P1a to P4a and P1b to P4b.

Figure 13A:
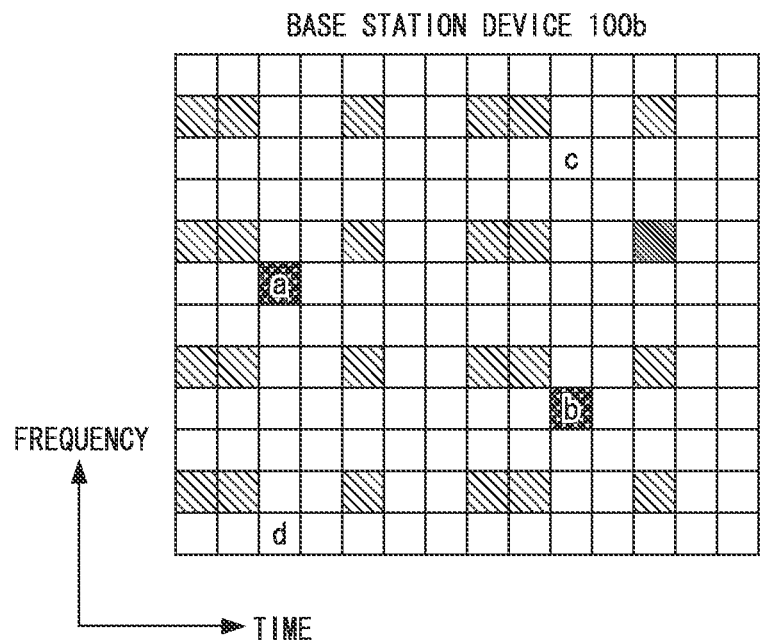
FIG. 13A is a diagram illustrating still another example of the arrangement of reference signals generated by cyclically shifting a sequence according to the second embodiment.
Figure 13B:
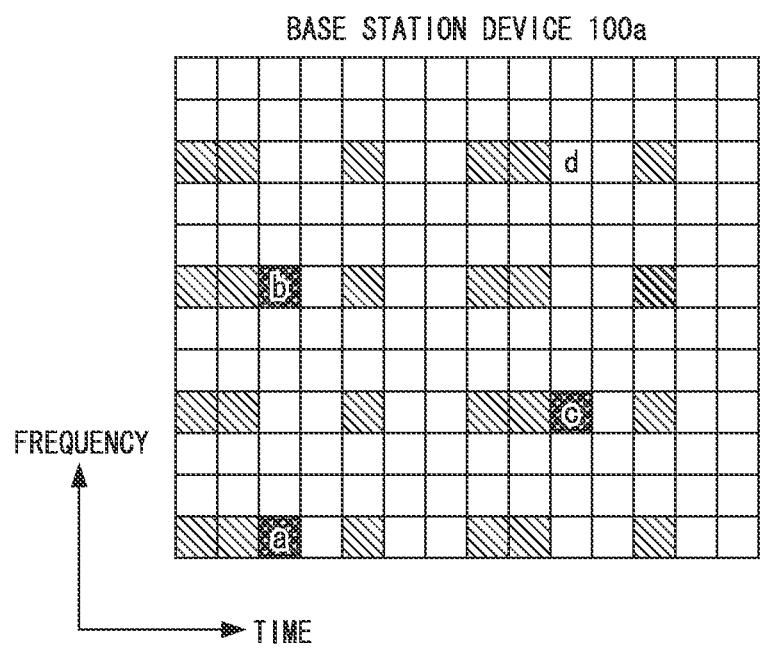
FIG. 13B is a diagram illustrating still another example of the arrangement of reference signals generated by cyclically shifting a sequence according to the second embodiment.

In the cases of FIGS. 13A and 13B, resource elements to which reference signals associated with the antenna ports P5a to P8a and P5b to P8b are mapped are fixed between neighboring cells, irrespective of resource elements to which reference signals associated with the antenna ports P1a to P4a and P1b to P4b are mapped. Even if resource elements are fixed between neighboring cells as in the cases of FIGS. 13A and 13B, reference signals may be shifted in units of cells that perform cooperative communication (such as units for clustering or active CoMP set).

Thanks to the mapping of reference signals as shown in FIGS. 10A to 10D, the mobile terminal device 200 can simultaneously receive reference signals from multiple base station devices 100a and 100b. Additionally, if the mobile terminal device 200 performs cooperative communication, the mobile terminal device performs a despreading process so that the peak positions at which reference signals from the base station devices 100a and 100b are obtained are different, and the reference signals are orthogonalized. For this reason, inter-cell interferences can be suppressed, thereby enabling the mobile terminal device 200 to generate adequate feedback information. If the mobile terminal device 200 does not perform cooperative communication, the mobile terminal device 200 uses each of reference signals independently in a similar manner to the conventional case, even if the reference signals are based on a pseudo noise sequence. Thereby, the mobile terminal device 200 can generate adequate feedback information in consideration of inter-cell interference power, without increasing additional processes and the like.

Further, if the mobile terminal device 200 does not perform cooperative communication, the mobile terminal device 200 does not need to measure reference signals for all neighboring cells to measure interference power from neighboring cells. Moreover, generation of adequate feedback information can be achieved without newly notifying the mobile terminal device 200 of control information and the like. Additionally, generation of adequate feedback information can be achieved without changing the structure of reference signals between the case where the mobile terminal device 200 performs cooperative communication and the case where the mobile terminal device does not perform cooperative communication, and without increasing a ratio of reference signals with respect to the entire resource (i.e., overhead).

The case, where signals based on a pseudo noise sequence are used for all the resource elements to which reference signals associated with newly added antenna ports are mapped, has been explained. However, signals based on a pseudo noise sequence may be used for part of the resource elements. For example, signals base on a pseudo noise sequence may be allocated to reference signals associated with at least one antenna port, and signals generated from random numbers based on cell IDs may be allocated to reference signals associated with the remaining antenna ports.

The case, where signals based on a pseudo noise sequence are used for all the resource elements to which reference signals associated with the respective antenna ports, has been explained. However, signals based on a pseudo noise sequence are used for only a part of the resource elements.

Although the case where the number of antenna ports is 4 has been explained above, the present invention is applicable to any cases as long as the number of antenna ports to be newly added is one or more.

Although the case, where there are reference signals associated with the antenna ports P1a to P4a and P1b to P4b, has been explained, there may not be those reference signals.

Although the case where reference signals are allocated to all resource blocks has been explained, reference signals may be allocated to only a part of the resource blocks.

Although the case, in which more four antenna ports are added to the four antenna ports P1a to P4a and P1b to P4b, has been explained above, the configuration is not limited thereto. For example, six or eight antenna ports may be newly added to two antenna ports.

Third Embodiment

Hereinafter, a third embodiment of the present invention is explained. A mobile communication system of the third embodiment includes similar base station devices 100a and 100b and a similar mobile terminal device 200a to those included in the mobile communication system of the first embodiment. Only a feedback information generator 212a of the mobile terminal device 200a differs from that of the mobile terminal device 200 of the first embodiment. Hereinafter, the different portions from those of the first embodiment are mainly explained.

Figure 14:
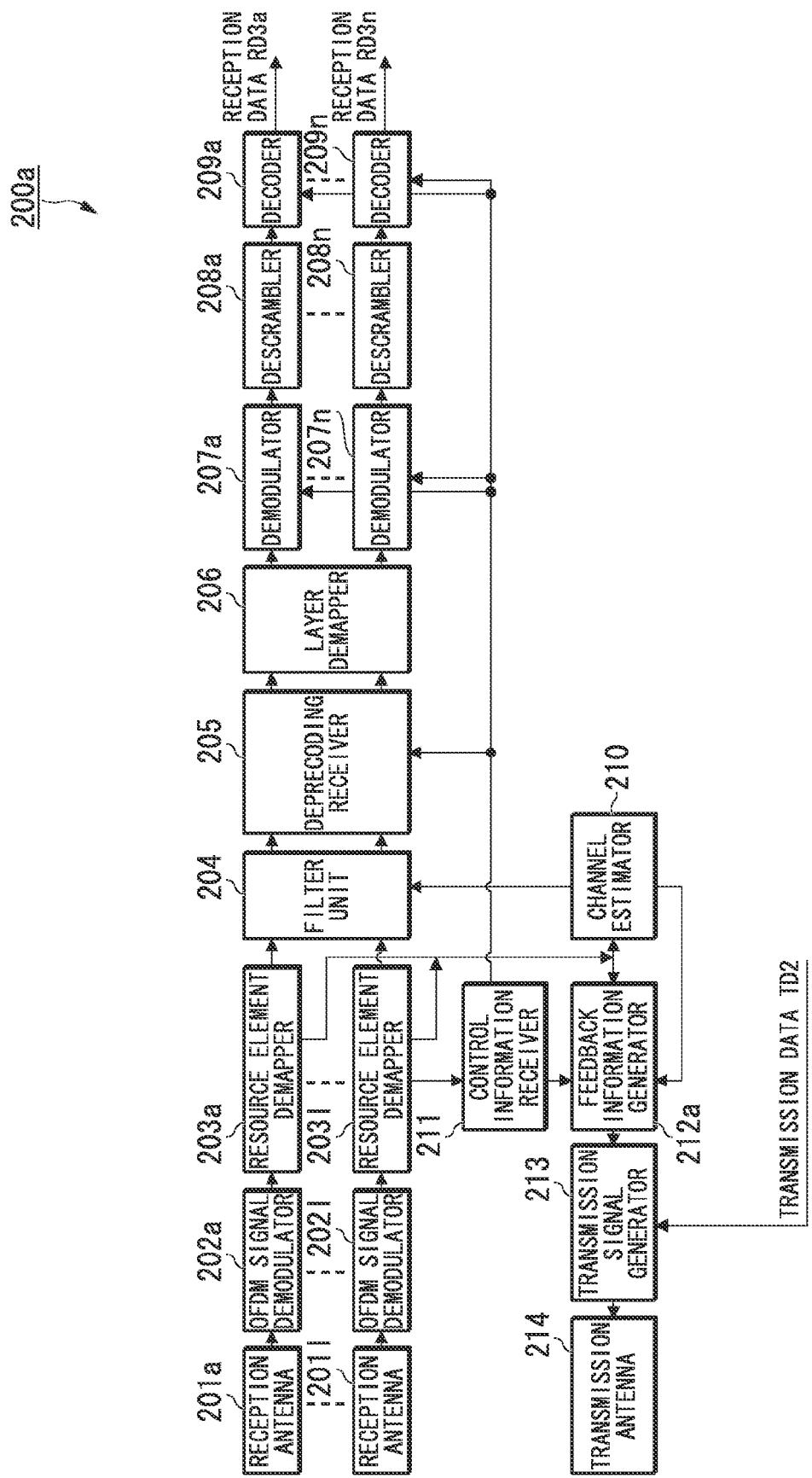
FIG. 14 is a schematic block diagram illustrating a configuration of a mobile terminal device 200a according to a third embodiment of the present invention.

FIG. 14 is a schematic block diagram illustrating a configuration of a mobile terminal device 200a according to the third embodiment. The mobile terminal device 200a includes: reception antennas 201a to 201l; OFDM signal demodulators 202a to 202l; resource element demappers 203a to 203l; a filter unit 204; a deprecoder 205; a layer demapper 206; demodulators 207a to 207n; descramblers 208a to 208n; decoders 209a to 209n; a channel estimator 210; a control information receiver 211; a feedback information generator 212a; a transmission signal generator 213; and a transmission antenna 214.

Figure 15:
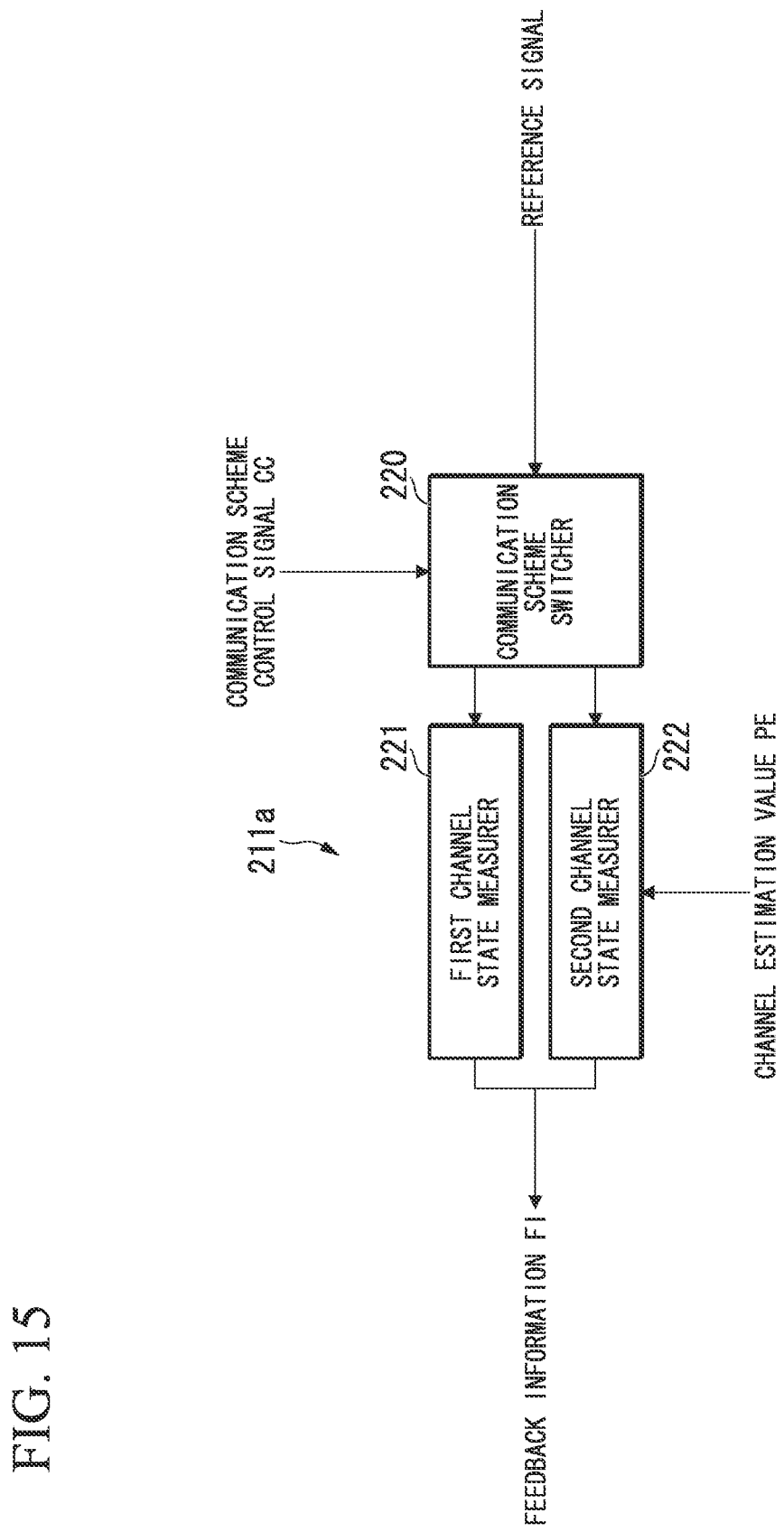
FIG. 15 is a schematic block diagram illustrating a configuration of a feedback information generator 212a according to the third embodiment.

FIG. 15 is a schematic block diagram illustrating a configuration of the feedback information generator 212a of the third embodiment. The feedback information generator 212a includes: a communication scheme switcher 220; a first channel state measurer 221; and a second channel state measurer 222.

The channel estimator 210 performs channel estimation based on reference signals output from the resource element demappers 203a to 203l. Then, the channel estimator 210 adds a channel estimation value PE to the filter unit 204, and outputs the channel estimation value to the feedback information generator 212a.

Similar to the feedback information generator 212 of the first embodiment, the feedback information generator 212a changes a communication scheme based on the communication scheme control signal CC. Then, the feedback information generator 212a outputs the reference signals RS output from the resource element demappers 203a to 203l to one of the first channel state measurer 221 or the second channel state measurer 222a. If the first channel state measurer 221 is selected, in other words, if feedback information for performing cooperative communication with a neighboring cell is not to be generated, the first channel state measurer 221 regards each of the reference signals as an independent signal to measure a channel state, and thereby generates feedback information FI. If the second channel state measurer 222a is selected, in other words, if feedback information for performing cooperative communication with a neighboring cell is to be generated, the second channel state measurer 222a performs a despreading process on reference signals, measures a channel state, and generates feedback information FI. The difference from the first embodiment is in that the second channel state measurer 222a controls a unit for performing a despreading process when generating feedback information, based on the channel estimation value PE received from the channel estimator 210.

Figure 16:
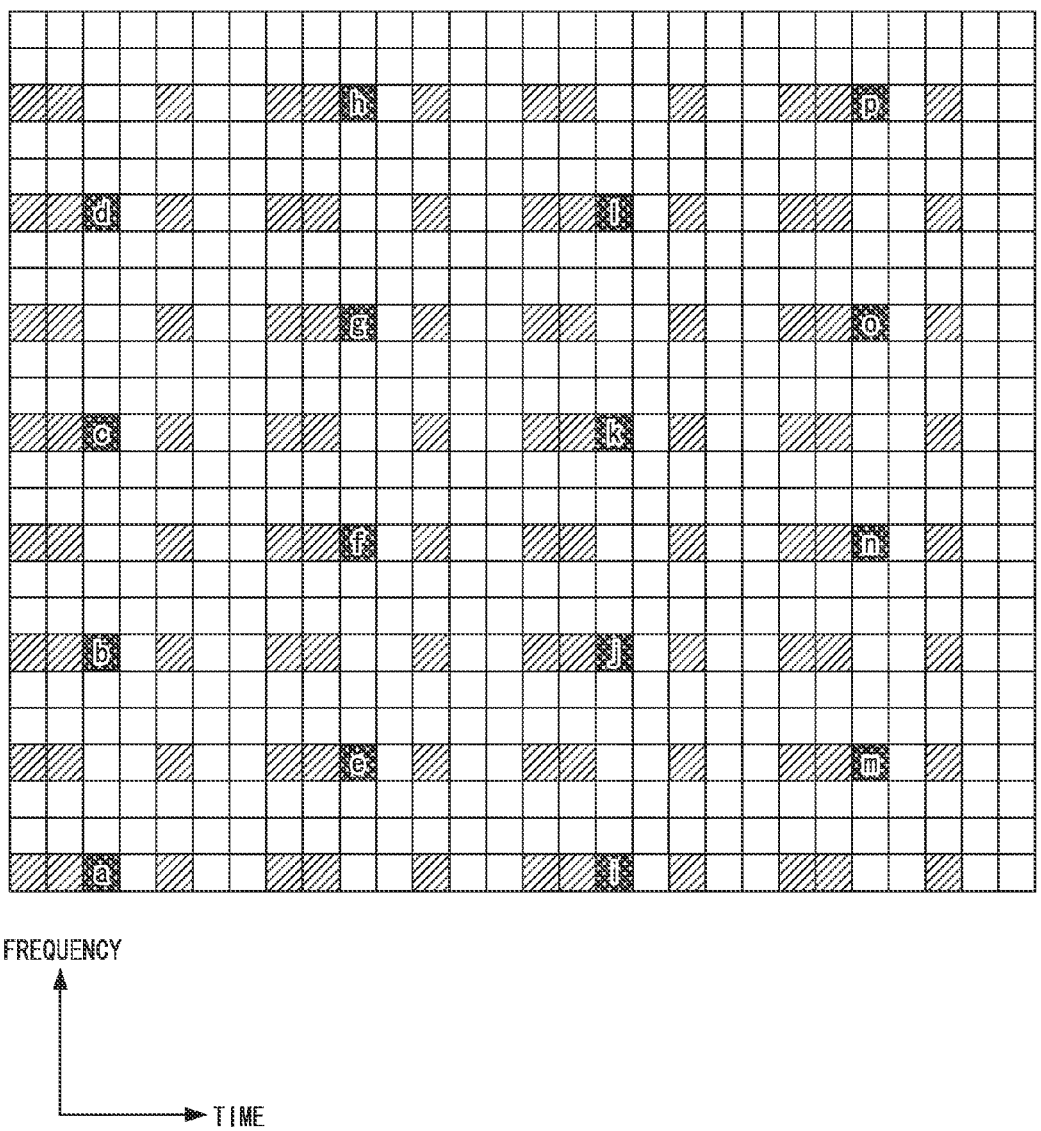
FIG. 16 is a diagram illustrating an example of a unit for performing a despreading process when feedback information is generated according to the third embodiment.

FIG. 16 is a diagram illustrating an example of a unit for performing a despreading process to generate feedback information. FIG. 16 shows two resource blocks in the frequency domain and four resource blocks in the time domain. FIG. 16 shows a case where reference signals (a to p) generated based on random numbers are mapped. The reference signals (a to p) are sequentially allocated in the order of a to p to: the first, seventh, thirteenth, and nineteenth subcarriers of the third OFDM symbol; the fourth, tenth, sixteenth, and twenty-second subcarriers of the tenth OFDM symbol; the first, seventh, thirteenth, and nineteenth subcarriers of the seventeenth OFDM symbol; and the fourth, tenth, sixteenth, twenty-second subcarriers of the twenty-fourth OFDM symbol. FIG. 16 shows a case where the antenna port 5 is focused on, similarly to the case of the second embodiment. The mobile terminal device 200a of the third embodiment performs a despreading process based on a channel estimation value calculated by the channel estimator 210.

Figure 17:
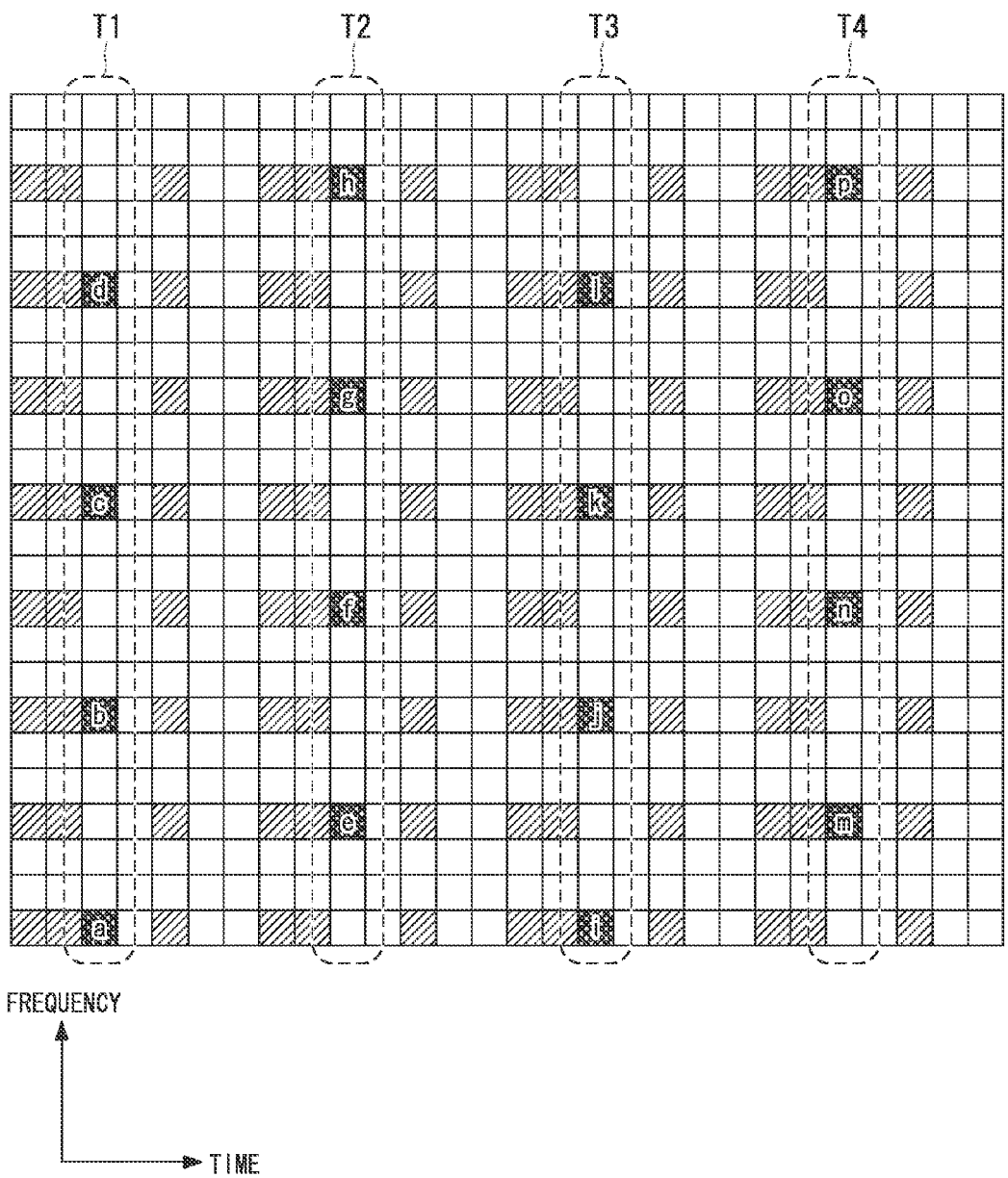
FIG. 17 is a diagram illustrating an example of a unit for performing a despreading process when a time variation is large according to the third embodiment.

For example, for a channel with a great time variation, the mobile terminal device 200a performs despreading processes on four respective chips which are reference signals "a, b, c, d" surrounded by a dashed line allocated with a symbol T1, reference signals "e, f, g, h" surrounded by a dashed line allocated with a symbol T2, reference signals "i, j, k, l"

surrounded by a dashed line allocated with a symbol T3, and reference signals "m, n, o, p" surrounded by a dashed line allocated with a symbol T4, as shown in FIG. 17. Thereby, inter-cell interferences can be reduced while suppressing effects due to a time variation. If the mobile terminal device 200a performs cooperative communication, the mobile terminal device 200a can generate adequate feedback information. The determination whether or not a channel has a great time variation is performed by, for example, the second channel state measurer 222a receiving the results of channel estimation by the channel estimator 210, based on whether or not a time variation of channel estimation values is greater than a predetermined threshold.

Figure 18:
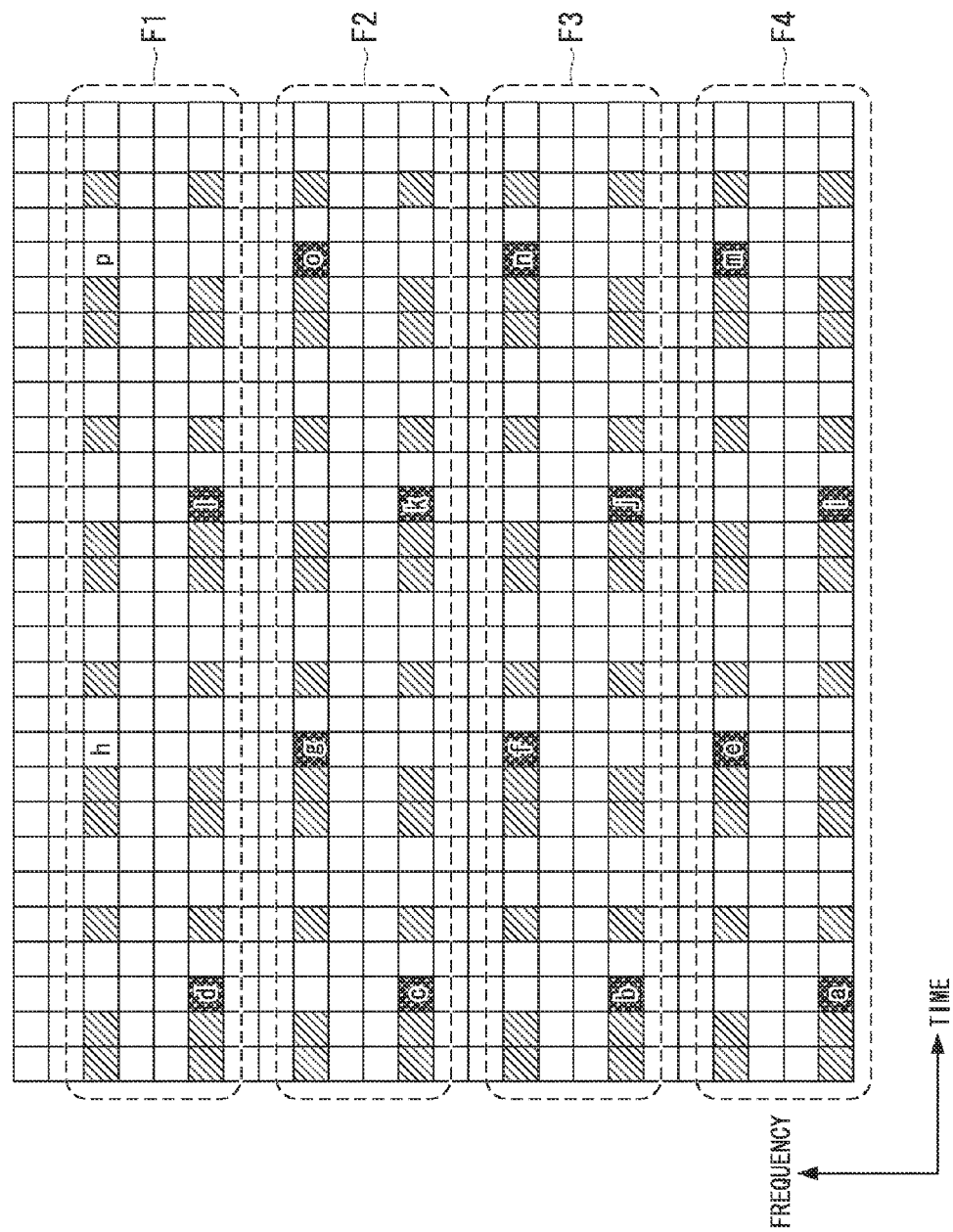
FIG. 18 is a diagram illustrating an example of a unit for performing a despreading process when a frequency variation is large according to the third embodiment.
Figure 19:
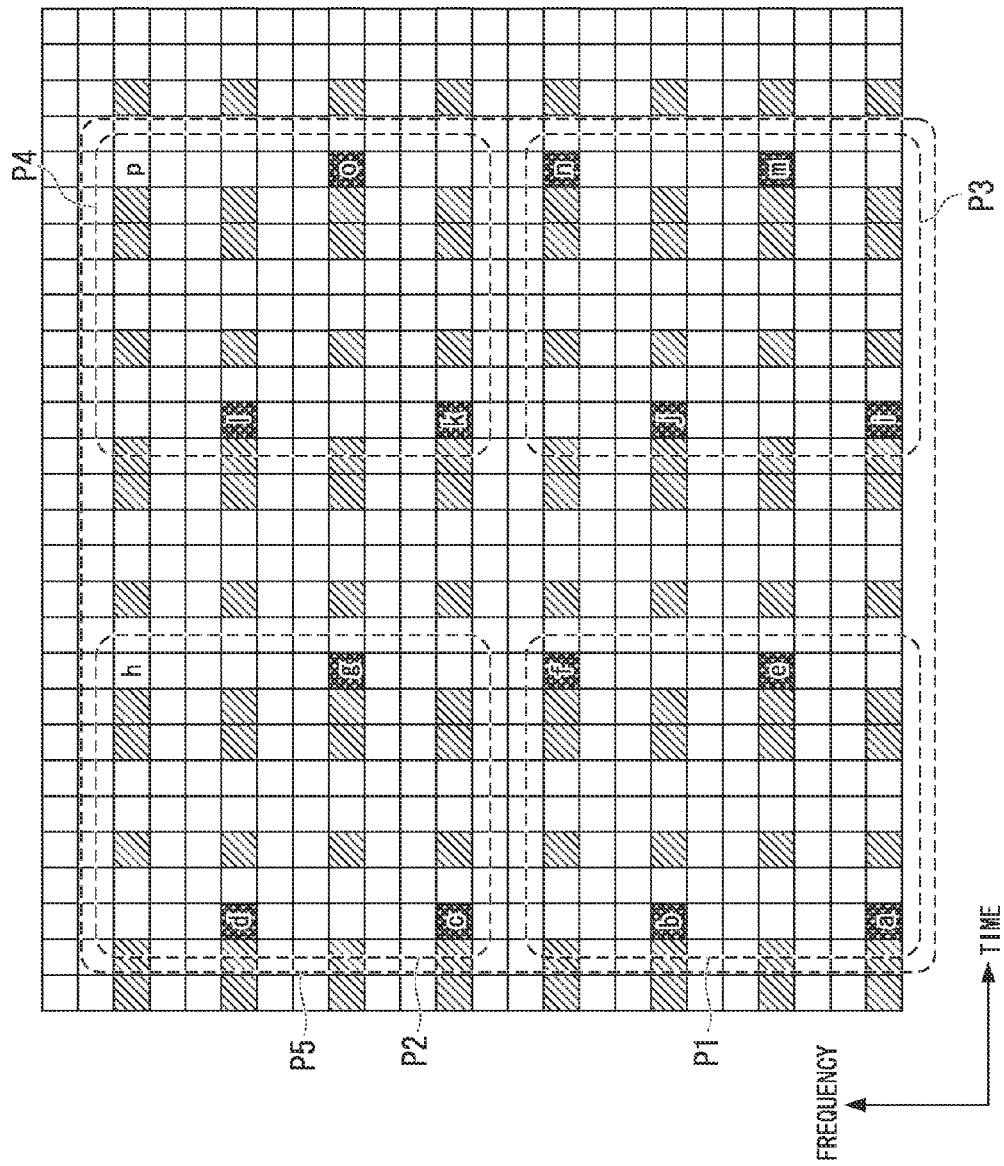
FIG. 19 is a diagram illustrating a case where a despreading process is performed in units according to inter-cell interferences according to the third embodiment.

Additionally, for a channel with a great frequency variation, the mobile terminal device 200a performs despreading processes on four respective chips which are reference signals "a, e, i, m" surrounded by a dashed line allocated with a symbol F1, reference signals "b, f, j, n" surrounded by a dashed line allocated with a symbol F2, reference signals "c, g, k, o" surrounded by a dashed line allocated with a symbol F3, and reference signals "d, h, l, p" surrounded by a dashed line allocated with a symbol F4, as shown in FIG. 18. Thereby, inter-cell interferences can be reduced while suppressing effects due to a frequency variation. If the mobile terminal device 200a performs cooperative communication, the mobile terminal device 200a can generate adequate feedback information. The determination whether or not a channel has a great frequency variation is performed by, for example, the second channel state measurer 222a receiving the results of channel estimation by the channel estimator 210, based on whether or not a frequency variation of channel estimation values is greater than a predetermined threshold.

Further, a unit for performing a despreading process can be changed according to the amount (power or power ratio) of inter-cell interferences (interferences with a peripheral cell or a peripheral transmission device). When the amount of inter-cell interferences are small, the mobile terminal device 200a performs despreading processes on the four respective chips which are reference signals "a, b, e, f" surrounded by a dashed line allocated with a symbol P1, reference signals "c, d, g, h" surrounded by a dashed line allocated with a symbol P2, reference signals "i, j, m, n" surrounded by a dashed line allocated with a symbol P3, and reference signals "k, l, o, p" surrounded by a dashed line allocated with a symbol P4. When the amount of inter-cell interferences is large, the mobile terminal device 200a performs a despreading process on sixteen chips of reference signals "a to p" surrounded by a dashed line allocated with a symbol P5. Thus, as the amount of inter-cell interferences increases, the mobile terminal device 200a performs a despreading process in units of more reference signals. Thereby, the suppression amount of interferences can be increased, and adequate feedback information according to the amount of inter-cell interferences and a time-and-frequency variation of a channel can be generated.

The case where the mobile terminal device 200a controls a unit for performing a despreading process has been explained. However, the base station device 100a or 100b may control the unit, and notifies the mobile terminal device 200a of the unit through control data.

As reference signals, the case where reference signals based on random numbers are used has been explained, reference signals based on a pseudo noise sequence may be used.

Fourth Embodiment

Hereinafter, a fourth embodiment of the present invention is explained. A mobile communication system according to the fourth embodiment includes similar base station devices 100a and 100b and a similar mobile terminal device 200 to those of the first embodiment. A mapping method used and a sequence to be mapped by the resource element mappers 106a to 106m of each of the base station device 100a and 100b differ from those of the first embodiment. The different portions from those of the first embodiment are mainly explained here. A case where the antenna ports 1 and 2 are used is explained in the fourth embodiment.

FIG. 20 shows an example thereof. This drawing shows a case where reference signals (4 chips (bits)) associated with the antenna ports 1 and 2 to be newly added, which are allocated over two resource blocks in the time domain, are generated based on an orthogonal code sequence, such as an OVSF code. Here, abcd (orthogonal code 1) and efgh (orthogonal code 2), which are mutually orthogonal, are used as orthogonal codes for the antenna port 1. ijkl (orthogonal code 1') and mnop (orthogonal code 2'), which are mutually orthogonal, are used as orthogonal codes for the antenna port 2. A combination of the same codes may be used between a combination of the orthogonal codes 1 and 2 and a combination of the orthogonal codes 1' and 2'. More specifically, a combination of the orthogonal codes 1 and 2 and a combination of the orthogonal codes 1' and 2' may be set from among four-chip OVSF sequences, which are 1111, 11-1-1, 1-1-11, and 1-1-1-1.

Mutually orthogonal sequences are used between neighboring base station devices (cells). Additionally, resource elements, to which reference signals are mapped, are made identical between neighboring cells, thereby maintaining the orthogonal relationship. At this time, the powers (or amplitudes) of reference signals mapped to the respective resource elements are preferably identical to the powers (or amplitudes) of symbols of transmission data signals mapped to other resource elements.

Figure 20A:
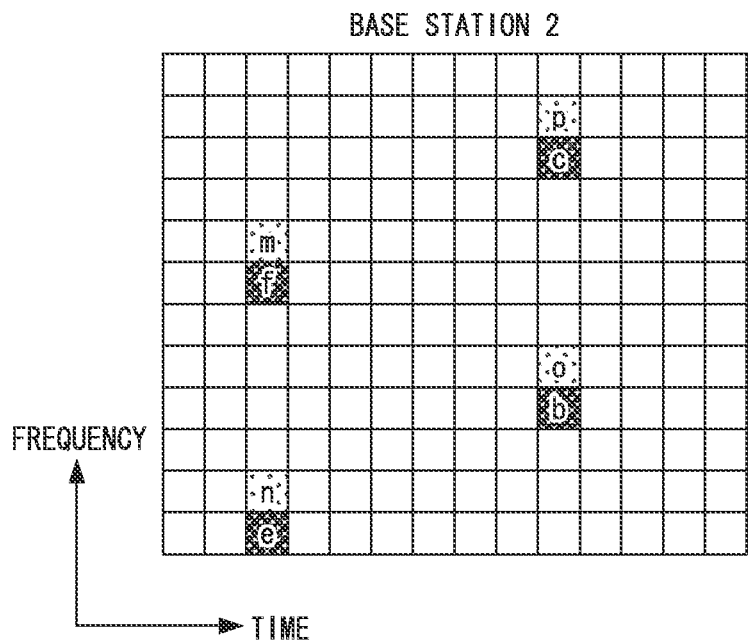
FIG. 20A is a diagram illustrating an example of reference signals and arrangement thereof according to a fourth embodiment of the present invention.
Figure 20B:
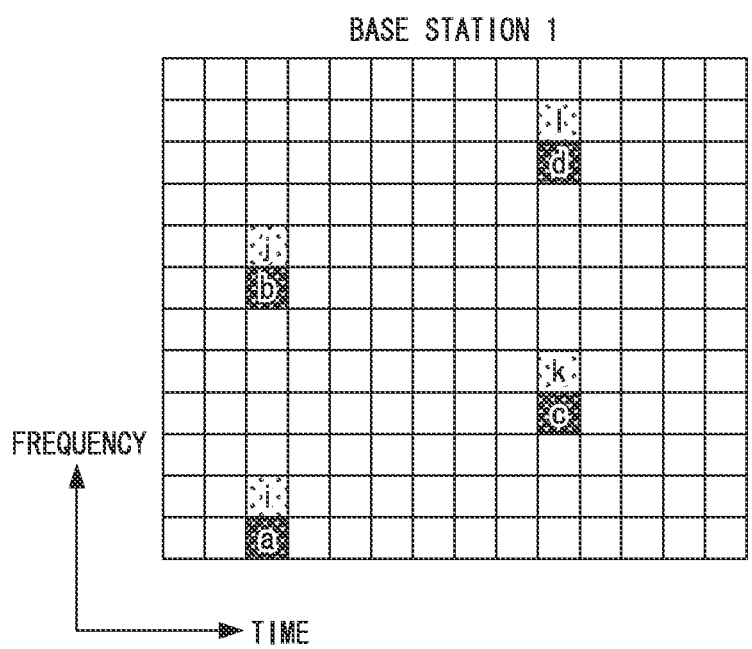
FIG. 20B is a diagram illustrating an example of reference signals and arrangement thereof according to the fourth embodiment.
Figure 21:
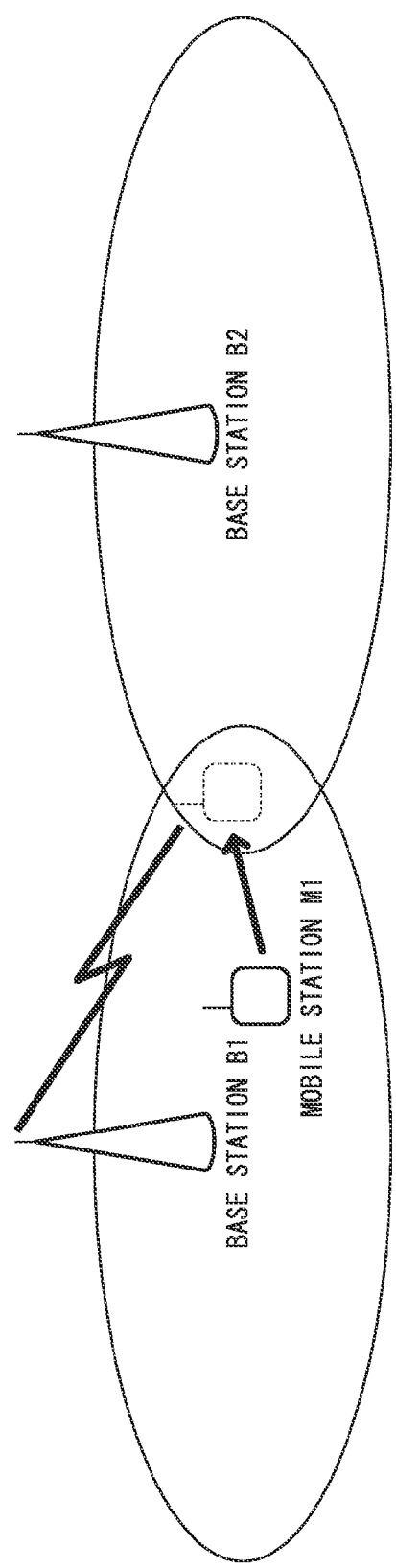
FIG. 21 is a diagram illustrating an example of a conventional mobile terminal present in a cell central region.
Figure 22:
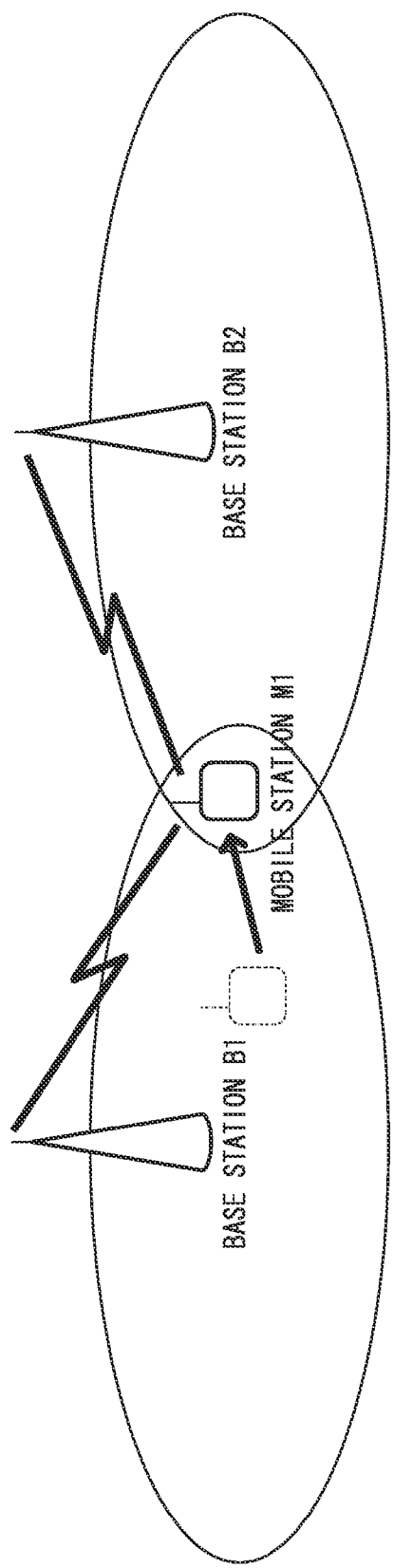
FIG. 22 is a diagram illustrating a conventional mobile terminal moving from the cell central region to a cell edge region.
Figure 23:
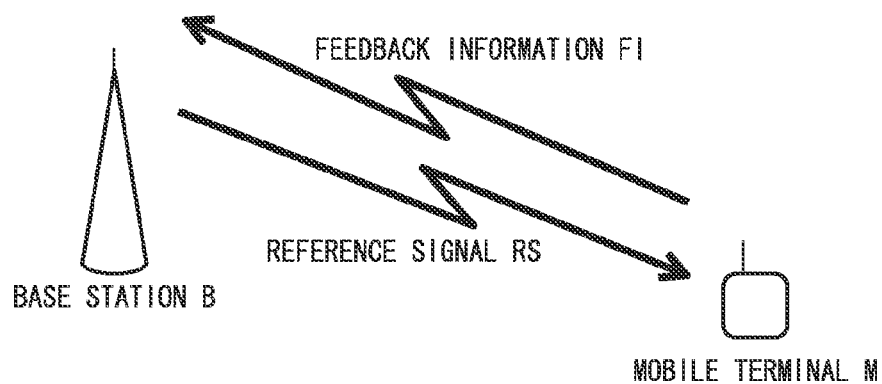
FIG. 23 is a diagram illustrating conventional downlink adaptive control.
Figure 24:
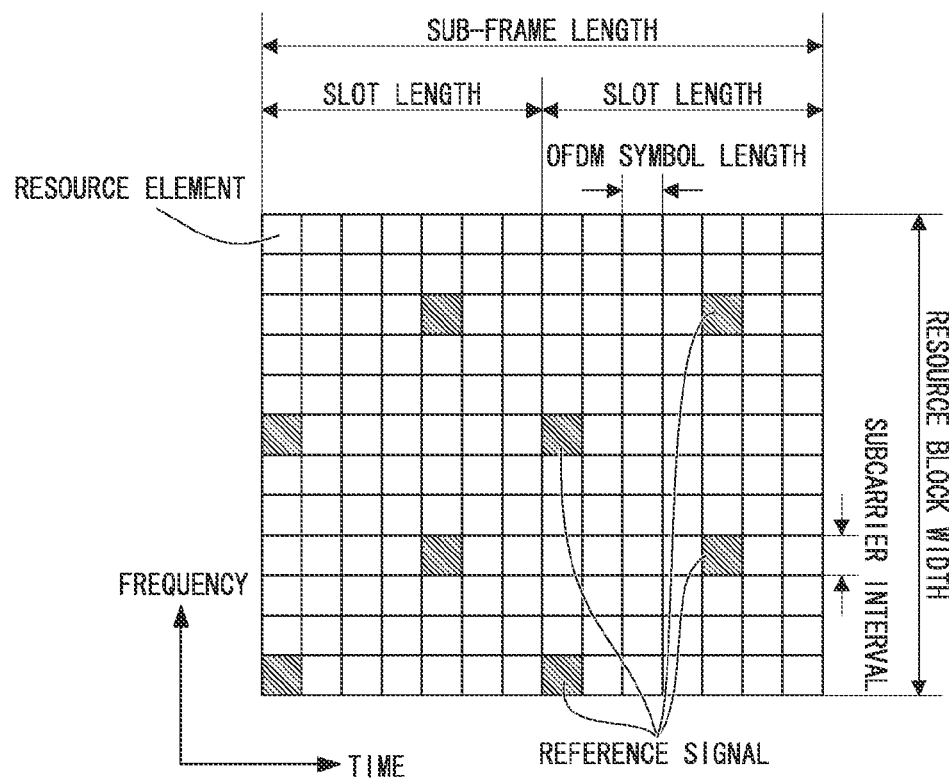
FIG. 24 is a diagram illustrating conventional arrangement of reference signals.

Reference signals are mapped as shown in FIGS. 20A and 20B. Thereby, the mobile terminal device 200 simultaneously receives reference signals transmitted from multiple base station devices 100a and 100b. If the mobile terminal device 200 performs cooperative communication, the mobile terminal device 200 performs a despreading process on the reference signals transmitted from the base station device 100a and the reference signals transmitted from the base station device 100b. Thereby, the mobile terminal device 200 can measure the signal powers (signal amplitudes) obtained by the respective base station devices 100a and 100b, while removing inter-cell interferences. Accordingly, the mobile terminal device 200 can estimate, based on the signal powers (signal amplitudes) obtained by the respective base station devices 100a and 100b, adequate feedback information for performing cooperative communication (such as comprehensive SINR, CQI/PMI based on the comprehensive SINR, SINR for the base station devices 100a and SINR for the base station device 100b, CQI/PMI based on the SINR for the base station device 100a, and CQI/PMI based on the SINR for the base station device 100b).

If the mobile terminal device 200 does not perform cooperative communication, the mobile terminal device 200 refers to the reference signals transmitted from the base station device (the associated base station, the associated cell, the serving cell) 100a in communication, performs a despreading process for the associated base station, and thereby can measure the signal power (signal amplitude) achieved by the associated base station while suppressing inter-cell interferences. Additionally, since each of chips of reference signals includes elements of interferences due to signals transmitted from a neighboring base station, the mobile terminal device 200 refers to the resource elements to which the reference signals are mapped (calculates a square of a norm of the difference between the amplitude of the reference signal transmitted from the associated station and the reception signal), and thereby can obtain the average interference signal power. Accordingly, the mobile terminal device 200 can estimate adequate feedback information (such as SINR, and CQI/PMI based on the SINR).

Thus, in a mobile communication system in which multiple base station devices 100a and 100b communicate with one mobile terminal device 200, the base station devices 100a and 100b determine modes of the mobile terminal device 200 (a mode (first mode) in which the base station devices 100a and 100b perform cooperative communication to communicate with the mobile terminal device 200, and a mode (second mode) in which each of the base station device 100a and 100b communicates with the mobile terminal device 200 without performing cooperative communication). Reference signals shared between the both modes are generated, and mapped to any ones of resource elements. At this time, orthogonal sequences which are orthogonal between the base station devices 100a and 100b are used as the reference signals, and the reference signals are mapped to the resource elements which are identical between the base station devices 100a and 100b.

If the mobile terminal device 200 does not perform cooperative communication (communicates independently with each of the base station devices 100a) (second mode), the mobile terminal device 200 measures channel states for notifying the base station devices 100a that are communication destinations, based on reference signals with use of the sequences used by the base station devices 100a that are the communication destinations. If the mobile terminal device 200 performs cooperative communication with the base station devices 100a and 100b (first mode), the mobile terminal device measures channel states for notifying the base station device 100a and 100b, based on the sequence used by the base station device 100a and the sequence used by the base station device 100b.

Thus, the same reference signal sequence is used for the case where the mobile terminal device 200 performs cooperative communication and the case where the mobile terminal device 200 does not perform cooperative communication. At the same time, if the mobile terminal device 200 performs cooperative communication, the mobile terminal device 200 can precisely recognize the powers of transmission signals transmitted from the base station devices 100a and 100b. If the mobile terminal device 200 does not perform cooperative communication, the mobile terminal device 200 can precisely recognize the powers of transmission signals transmitted from the associated base station and obtain the average power of interference signals from a neighboring base station. Accordingly, adequate feedback information can be estimated while reducing the number of processes by sharing the reference signals, in both the case where cooperative communication is performed and the case where the cooperative communication is not performed.

The case, in which a control data signal including a communication scheme control signal, and a transmission data signal are multiplexed in a physical layer, and each of the base station devices 100a and 100b notifies the mobile terminal device 200 of the communication scheme control signal, has been explained in the above embodiments. However, the communication scheme control signal may be configured to be reported by an upper layer instead of the physical layer. At this time, the control information generator 113 of each of the base station devices 100a and 100b is configured to generate the communication scheme control signal, and output the generated communication scheme control signal as a transmission data signal in the physical layer to the encoder 101a. Additionally, the control information receiver 211 of the mobile terminal device 200 is configured to obtain the communication scheme control signal from the transmission data signal output from the decoder 209a.

A computer readable recording medium may record a program for implementing: the encoders 101a to 101n, the scramblers 102a to 102n, the modulators 103a to 103n, the layer mapper 104, the precoder 105, the resource element mappers 106a to 106m, the reference signal generator 114, the feedback information processor 112, the control information generator 113, and the controller 115, which are shown in FIG. 2; the resource element demappers 203a to 203l, the filter unit 204, the deprecoder 205, the layer demapper 206, the demodulators 207a to 207n, the descramblers 208a to 208n, the decoders 209a to 209n, the channel estimator 210, the control information receiver 211, the feedback information generator 212, and the transmission signal generator 213, which are shown in FIG. 4; the resource element demappers 203a to 203l, the filter unit 204, the deprecoder 205, the layer demapper 206, the demodulators 207a to 207n, the descramblers 208a to 208n, the decoders 209a to 209n, the channel estimator 210, the control information receiver 211a, the feedback information generator 212, and the transmission signal generator 213, which are shown in FIG. 14. Then, processes for the respective units may be performed by a computer system reading and executing the program recorded in the recording medium. The "computer system" includes OS and hardware, such as a peripheral device.

Additionally, the "computer readable recording medium" includes a portable medium such as a flexible disc, a magneto-optical disc, a ROM, or a CD-ROM, and a storage device such as a hard disk built in the computer system. The "computer readable recording medium" may include a medium that dynamically stores a program for a short period of time, such as a communication line used when a program is transmitted via a network such as the Internet or a communication line such as a telephone line. Additionally, the "computer readable recording medium" may include a medium that stores a program for a predetermined period of time, such as a volatile memory built in a computer system serving as a server or client when the program is transmitted via a network such as the Internet or a communication line such as a telephone line. Additionally, the program may be a program for implementing part of the aforementioned functions. Further, the program may be a program that can implement the aforementioned functions in combination with a program already recorded on the computer system.

Although embodiments of the present invention have been explained in detail with reference to the drawings, the specific configuration is not limited to those embodiments, and various design modifications and the like may be made without departing from the scope of the present invention.

DESCRIPTION OF REFERENCE NUMERALS 100a, 100b: base station device
101a to 101n: encoder
102a to 102n: scrambler
103a to 103n: modulator
104: layer mapper
105: precoder
106a to 106m: resource element mapper
107a to 107m: OFDM signal generator
108a to 108m: transmission antenna 110: reception antenna
111: reception signal processor
112: feedback information processor
113: control information generator
114: reference signal generator
115: controller
116: communication unit
200, 200a: mobile terminal device
201a to 201l: reception antenna
202a to 202l: OFDM signal demodulator
203a to 203l: resource element demapper
204: filter unit
205: precoder
206: layer demapper
207a to 207n: demodulator
208a to 208n: descrambler
209a to 209n: decoders
210: channel estimator
211: control information receiver
212, 212a: feedback information generator
213: transmission signal generator
214: transmission antenna
220: communication scheme switcher
221: first channel state measurer
222: second channel state measurer
300: network

The invention claimed is:

1. A wireless communication system comprising:
a base station device; and
a mobile station device configured to communicate with the base station device,
wherein the base station device comprises:
a pilot signal generator configured to generate a pilot signal; and
a radio transmitter configured to transmit to the mobile station device, the pilot signal generated by the pilot signal generator,
the mobile station device comprises:
a measurer configured to measure, using the pilot signal transmitted from the base station device, a state of a channel between the mobile station device and the base station device; and
a feedback information generator configured to generate feedback information based on a result of measurement performed by the measurer,
the mobile station device is configured to selectively measure, using control information reported from the base station device, any one of a state of the channel including an interference due to a signal transmitted from another base station device, and a state of the channel including the interference that is reduced, and to selectively generate the feedback information, wherein
the feedback information comprises information indicating an encoding rate and a modulation scheme which are to be recommended to the base station device, and
the base station device is configured to share, with the other base station device through a network, information related to an interference with the other base station device.

2. The wireless communication system according to claim 1, wherein the control information comprises information indicating whether or not to order the mobile station device to generate the feedback information in order for the base station device to cooperatively communicate with the other base station device.

3. The wireless communication system according to claim 1, wherein the pilot signal generator is configured to generate the pilot signal based on an orthogonal code sequence.

4. The wireless communication system according to claim 1, wherein the base station device is configured to report a control signal to the mobile station device through an RRC signaling that is a higher layer signal.

5. A mobile station device configured to communicate with a base station device, the mobile station device comprising:
a measurer configured to measure, using a pilot signal transmitted from the base station device, a state of a channel between the mobile station device and the base station device; and
a feedback information generator configured to generate feedback information based on a result of measurement performed by the measurer,
wherein the mobile station device is configured to selectively measure, using control information reported from the base station device, any one of a state of the channel including an interference due to a signal transmitted from another base station device, and a state of the channel including the interference that is reduced, and to selectively generate the feedback information, wherein
the feedback information comprises information indicating an encoding rate and a modulation scheme which are to be recommended to the base station device, and
information related to an interference with the other base station device is shared between the base station device and the other base station device through a network.

6. A base station device configured to communicate with a mobile station device capable of measuring one of a state of a channel including an interference due to a signal transmitted from another base station device, and a state of the channel including the interference that is reduced, the base station device comprising:
a pilot signal generator configured to generate a pilot signal; and
a radio transmitter configured to transmit to the mobile station device, the pilot signal generated by the pilot signal generator,
wherein the base station device is configured to report, to the mobile station device, control information for the mobile station device to selectively measure any one of the states of the channel by using the pilot signal, and to selectively generate the feedback information, wherein
the feedback information comprises information indicating an encoding rate and a modulation scheme, and
the base station device is configured to share, with the other base station device through a network, information related to an interference with the other base station device.

7. The base station device according to claim 6, wherein the control information comprises information indicating whether or not to order the mobile station device to generate the feedback information in order for the base station device to cooperatively communication with the other base station device.

8. The base station device according to claim 6, wherein the pilot signal generator is configured to generate the pilot signal based on an orthogonal code sequence.

9. The base station device according to claim 6, wherein the base station device is configured to transmit a control signal to the mobile station device through an RRC signaling that is a higher layer signal.

10. A communication method for a mobile station device configured to communicate with a base station device, the communication method comprising:

measuring, using a pilot signal transmitted from the base station device, a state of a channel between the mobile station device and the base station device;

generating feedback information based on a result of measurement performed by the measurer; and selectively measuring, using control information reported from the base station device, any one of a state of the channel including an interference due to a signal transmitted from another base station device, and a state of the channel including the interference that is reduced, and selectively generating the feedback information, wherein the feedback information comprises information indicating an encoding rate and a modulation scheme which are to be recommended to the base station device, and information related to an interference with the other base station device is shared between the base station device and the other base station device through a network.

11. A communication method for a base station device configured to communicate with a mobile station device capable of measuring one of a state of a channel including an interference due to a signal transmitted from another base station device, and a state of the channel including the interference that is reduced, the communication method comprising:

sharing with the other base station device through a network, information related to an interference with the other base station device;

generating a pilot signal;

transmitting the pilot signal generated to the mobile station device; and reporting to the mobile station device, control information for the mobile station device to selectively measure any one of the states of the channel by using the pilot signal, and to selectively generate the feedback information, wherein the feedback information comprises information indicating an encoding rate and a modulation scheme.

12. The communication method according to claim 11, wherein the control information comprises information indicating whether or not to order the mobile station device to generate the feedback information in order for the base station device to cooperatively communicate with the other base station device.

13. The communication method according to claim 11, wherein the pilot signal is generated based on an orthogonal code sequence.

14. The communication method according to claim 11, wherein the control information is reported to the mobile station device through an RRC signaling that is a higher layer signal.

15. A non-transitory recording medium used for a mobile station device configured to communicate with a base station device, the non-transitory recording medium storing a program implementing:

a function of measuring, using a pilot signal transmitted from the base station device, a state of a channel between the mobile station device and the base station device;

a function of generating feedback information based on a result of measurement performed; and a function of selectively measuring, using control information reported from the base station device, any one of a state of the channel including an interference due to a signal transmitted from another base station device, and a state of the channel including the interference that is reduced, and selectively generating the feedback information, wherein the feedback information comprises information indicating an encoding rate and a modulation scheme which are to be recommended to the base station device, and information related to an interference with the other base station device is shared between the base station device and the other base station device through a network.

16. A non-transitory recording medium used for a base station device configured to communicate with a mobile station device capable of measuring one of a state of a channel including an interference due to a signal transmitted from another base station device, and a state of the channel including the interference that is reduced, the non-transitory recording medium storing a program implementing:

a function of sharing with the other base station device through a network, information related to an interference with the other base station device;

a function of generating a pilot signal;

a function of transmitting the pilot signal generated to the mobile station device; and a function of reporting, to the mobile station device, control information for the mobile station device to selectively measure any one of the states of the channel by using the pilot signal, and to selectively generate the feedback information, wherein the feedback information comprises information indicating an encoding rate and a modulation scheme.

17. The non-transitory recording medium according to claim 16, wherein the control information comprises information indicating whether or not to order the mobile station device to generate the feedback information in order for the base station device to cooperatively communicate with the other base station device.

18. The non-transitory recording medium according to claim 16, wherein the recording medium stores a program implementing:

a function of generating the pilot signal based on an orthogonal code sequence.

19. The non-transitory recording medium according to claim 16, wherein the recording medium stores a program implementing:

a function of reporting the control information to the mobile station device through an RRC signaling that is a higher layer signal.

\* \* \* \* \*